(12) United States Patent
Takamatsu et al.

(10) Patent No.: US 9,625,719 B2
(45) Date of Patent: Apr. 18, 2017

(54) PROJECTION DISPLAY DEVICE

(71) Applicant: Yazaki Corporation, Tokyo (JP)

(72) Inventors: Masahiro Takamatsu, Makinohara (JP); Masahide Nagata, Makinohara (JP); Shunsuke Ono, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/843,213

(22) Filed: Sep. 2, 2015

(65) Prior Publication Data

US 2016/0070102 A1 Mar. 10, 2016

(30) Foreign Application Priority Data

Sep. 4, 2014 (JP) ................................ 2014-180250
Sep. 4, 2014 (JP) ................................ 2014-180386
Sep. 4, 2014 (JP) ................................ 2014-180387

(51) Int. Cl.
 *G02B 27/14* (2006.01)
 *G09G 5/00* (2006.01)
 *G02B 27/01* (2006.01)

(52) U.S. Cl.
 CPC ..... *G02B 27/0149* (2013.01); *G02B 27/0101* (2013.01); *G02B 2027/014* (2013.01); *G02B 2027/0159* (2013.01)

(58) Field of Classification Search
 CPC .... G02B 2027/0112; G02B 2027/0136; G02B 2027/0145; G02B 2027/0154;

(Continued)

(56) References Cited

U.S. PATENT DOCUMENTS

2007/0132897 A1 6/2007 Nakamura et al.
2014/0176862 A1 6/2014 Uehara
2014/0268358 A1* 9/2014 Kusaka .................. G02B 27/01
 359/631

FOREIGN PATENT DOCUMENTS

JP S 63-182935 U 11/1988
JP H 5-85222 A 4/1993
(Continued)

OTHER PUBLICATIONS

Office Action dated Oct. 4, 2016, issued by the Japanese Intellectual Property Office in counterpart Japanese Application No. 2014-180250.

(Continued)

*Primary Examiner* — William Choi
(74) *Attorney, Agent, or Firm* — Sughrue Mion, PLLC

(57) ABSTRACT

A projection display device which outputs light that carries information including an arbitrary planar display image displayed in a prescribed display region and guides the light to a windshield of a vehicle so that the display image carried by the light reflected from a surface of the windshield or its vicinity is projected and visually recognized as a virtual image from a prescribed eye point. A first image forming plane and a second image forming plane are provided as image forming planes of the virtual image, the first image forming plane is disposed approximately parallel with a plane that is perpendicular to a line of sight that connects the eye point and the virtual image, and the second image forming plane is inclined with respect to the plane that is perpendicular to the line of sight that connects the eye point and the virtual image.

13 Claims, 13 Drawing Sheets

(58) Field of Classification Search
CPC .... G02B 2027/0159; G02B 2027/0181; G02B 2027/0196; G02B 27/01; G02B 27/0101
USPC .......................................... 359/630; 345/7–9
See application file for complete search history.

(56) References Cited

FOREIGN PATENT DOCUMENTS

| | | |
|---|---|---|
| JP | H 8-194185 A | 7/1996 |
| JP | 11-47374 A | 2/1999 |
| JP | 2003237412 A | 8/2003 |
| JP | 2007156295 A | 6/2007 |
| JP | 2007333995 A | 12/2007 |
| JP | 200830638 A | 2/2008 |
| JP | 2009-145829 A | 7/2009 |
| JP | 2012242586 A | 12/2012 |
| JP | 2013-241035 A | 12/2013 |
| JP | 2014-10418 A | 1/2014 |
| JP | 2014126716 A | 7/2014 |
| WO | 2013051376 A1 | 4/2013 |

OTHER PUBLICATIONS

Office Action dated Oct. 4, 2016, issued by the Japanese Intellectual Property Office in counterpart Japanese Application No. 2014-180386.

Office Action dated Oct. 4, 2016, issued by the Japanese Intellectual Property Office in counterpart Japanese Application No. 2014-180387.

\* cited by examiner

PROJECTION DISPLAY DEVICE

CROSS REFERENCE TO RELATED APPLICATION

This application is based on Japanese Patent Applications Nos. 2014-180250, filed on Sep. 4, 2014, 2014-180386, filed on Sep. 4, 2014, and 2014-180387, filed on Sep. 4, 2014, the contents of which are incorporated herein by reference.

BACKGROUND

1. Technical Field

The present invention relates to a projection display device which performs display utilizing reflection of light from, for example, the windshield that is disposed in front of the driver in a vehicle.

2. Related Art

In, for example, general vehicular head-up display (HUD) devices, an optical path is formed so that an optical image containing various kinds of information to be displayed is projected onto the front windshield or a reflection plate called a combiner from an HUD unit and light reflected from, for example, the front windshield travels toward the eye point of the driver. Therefore, the driver can visually recognize, as a virtual image, an HUD display image appearing on, for example, the front windshield while also visually recognizing a scene ahead of the vehicle through the front windshield. That is, the driver can visually recognize various kinds of information through display on the HUD without the need for moving his or her line of sight while maintaining an ordinary drive state.

For example, Patent documents 1-4 disclose prior art techniques relating to the invention. In the technique disclosed in Patent document 1, to perform pseudo-3D display on the display screen of a game machine, a background region that is adjacent to a display region of a text pattern etc. is shaded.

Patent document 2 discloses a device that, to enable pseudo-3D display, is equipped with a display unit, a mirror for reflecting an image displayed on the display unit toward an observation position, and an angle changing means for changing the angle of the mirror.

Patent document 3 discloses a vehicular display device (HUD device) capable of being installed easily at a proper position in the depth direction.

Patent document 4 relates to an HUD device and discloses a technique for displaying a 3D image by displaying a right-eye virtual image and a left-eye virtual image using a right-eye display and a left-eye display which are independent of each other.

PRIOR ART DOCUMENTS

Patent Documents

[Patent document 1] JP-A-11-47374
[Patent document 2] JP-A-2009-145829
[Patent document 2] JP-A-2013-241035
[Patent document 2] JP-A-2014-10418

SUMMARY OF THE INVENTION

In general vehicular HUD devices, a display image that is projected to form a virtual image and a real scene outside the vehicle are displayed in superimposition. In this case, since a planar display image of the HUD device and a stereographic scene are superimposed on each other, the combined image would be somewhat unnatural to the driver. More specifically, since an image with perspective and an image without perspective are superimposed on each other, it is difficult for the driver to make eye focus adjustment in viewing either an outside scene or a displayed image.

There is another problem that the driver may feel uncomfortable due to a difference between perceived distances of an outside scene and a displayed image. Furthermore, if there is a discrepancy between the perspective of a real outside scene and that of a displayed content, it is difficult for the driver to recognize a current situation intuitively from the displayed content. Still further, devices that perform planar display may give users a feeling of cheapness, which means lowering of their values.

If an HUD device could display an image with perspective, the above problems would be solved or lessened. However, to employ a technique as disclosed in Patent document 4, plural displays need to be provided, which results in a very high device cost. The technique of Patent document 3 cannot realize display with perspective though it enables adjustment of the display position in the front-rear direction.

In the technique of Patent document 2, the position of a displayed image cannot be fixed because it is moved to a large extent as the mirror angle varies. Although the technique of Patent document 1 enables pseudo-3D display using a background that is varied in density, in actuality it cannot provide perspective because the distance between the eye point and the image is constant.

Furthermore, to enable precise display of a pseudo-3D display pattern, it is necessary to provide a large-capacity storage device for holding data of various predetermined display patterns and a high-performance graphic display processor for drawing a 3D image on a two-dimensional coordinate plane, inevitably resulting in a very high device cost.

Where a virtual image is displayed by an HUD device, it is not always better to display an image with perspective. For example, where a speedometer is displayed, it is desirable for the driver to read a vehicle speed value instantaneously. However, a numerical value that is displayed with perspective lowers its legibility, possibly requiring a longer time for the driver to read it.

The present invention has been made in view of the above circumstances, and a first object of the invention is to provide a projection display device that can prevent reduction in legibility and enables display with perspective and depth while suppressing device cost increase.

If an HUD device could display an image with perspective, problems that the driver hay have difficulty making eye focus adjustment in viewing either an outside scene or a displayed image and that the driver may feel uncomfortable due to a difference in perceived distance between an outside scene and a displayed image would be solved or lessened. However, to employ a technique as disclosed in Patent document 4, plural displays need to be provided, which results in a very high device cost. The technique of Patent document 3 cannot realize display with perspective though it enables adjustment of the display position in the front-rear direction.

In the technique of Patent document 2, the position of a displayed image cannot be fixed because it is moved to a large extent as the mirror angle varies. Although the technique of Patent document 1 enables pseudo-3D display using a background that is varied in density, in actuality it cannot provide perspective because the distance between the eye point and the image is constant.

A second object of the invention is to provide a projection display device that can provide perspective that is suitable for an outside scene that appears at such a position as to be superimposed on or to be adjacent to a displayed image while suppressing device cost increase.

A third object of the invention is to provide a projection display device that can provide, when necessary, perspective or depth that is suitable for an outside scene that appears at such a position as to be superimposed on or to be adjacent to a displayed image while suppressing device cost increase.

To attain the first object, the invention provides projection display devices of the following items (1)-(7):

(1) A projection display device which outputs, from a projection unit, light that carries information including an arbitrary planar display image displayed in a prescribed display region and guides the light to a windshield of a vehicle or its vicinity so that the display image carried by the light reflected from a surface of the windshield or its vicinity is projected and visually recognized as a virtual image from a prescribed eye point, characterized in:

that a first image forming plane and a second image forming plane are provided as image forming planes of the virtual image;

that the first image forming plane is disposed approximately parallel with a plane that is perpendicular to a line of sight that connects the eye point and the virtual image;

that the second image forming plane is inclined with respect to the plane that is perpendicular to the line of sight that connects the eye point and the virtual image.

(2) The projection display device according to item (1), characterized by comprising:

a first display panel for formation of a virtual image in the first image forming plane; and a second display panel for formation of a virtual image in the second image forming plane, the projection display device further characterized in:

that the first display panel is disposed so as to be approximately perpendicular to an optical axis for exit light;

that the second display panel is disposed so as to be inclined from an optical axis for exit light; and that the projection unit outputs light beams for formation of the virtual images on the basis of the exit light of the first display panel and the exit light of the second display panel.

(3) The projection display device according to item (2), characterized by further comprising a virtual image display control unit which judges a type of display subject information when receiving it from outside, and selects the first display panel or the second display panel as an output destination of the display subject information.

(4) The projection display device according to item (3), characterized in that the virtual image display control unit selects the first display panel as the output destination of the display subject information if the received display subject information is assigned a planar display attribute, and selects the second display panel as the output destination of the display subject information if the received display subject information is assigned a 3D display attribute.

(5) The projection display device according to item (1), characterized by further comprising an inclination adjustment mechanism which adjusts the inclination angle of the second image forming plane.

(6) The projection display device according to item (1), characterized in that the second image forming plane is inclined in such a direction that a distance from the eye point to a top end of the virtual image is longer than a distance from the eye point to a bottom end of the virtual image in a case that the virtual image is formed below a horizontal line passing through the eye point.

(7) The projection display device according to item (2), characterized in that the second display panel is a transmission display panel, the projection display device further characterized by further comprising:

an illumination backlight disposed behind the second display panel.

In the projection display device having the configuration of item (1), a display in the first image forming plane or a display in the second image forming plane can be used selectively so as to be suitable for a situation. Since a display in the first image forming plane is without perspective or depth, it is higher in legibility. Since the second image forming plane is inclined from the plane that is perpendicular to the line of sight, there is a difference between the distance from the eye point (viewing point of the driver) to the top end of a virtual image and the distance from the eye point to the bottom end of the virtual image. That is, perspective and depth can be produced depending on the difference between the vertical positions of portions of the virtual image, without the need for displaying a 3D image elaborately. The perspective of the virtual image can be made equal to that of a real outside scene.

In the projection display device having the configuration of item (2), a virtual image can be formed in the first image forming plane by means of the first display panel and a virtual image can be formed in the second image forming plane by means of the second display panel. Since the virtual image is formed by means of the second display panel using light that travels in a direction that is inclined from the direction that is perpendicular to its surface, the second image forming plane can be inclined from the plane that is perpendicular to the line of sight. That is, the corresponding image forming plane can be inclined by disposing the second display panel in an inclined state.

According to the projection display device having the configuration of item (3) an adjustment can be made automatically so that a virtual image is formed in a desirable state in the first image forming plane or the second image forming plane taking into consideration whether or not a displayed image should be high in legibility and should be given perspective.

According to the projection display device having the configuration of item (4), a proper output destination of display subject information can be selected so that information not requiring 3D display is displayed using the first display panel and information requiring 3D display is displayed using the second display panel.

According to the projection display device having the configuration of item (5), the perspective or depth of a 3D virtual image can be adjusted in a desired manner so as to be suitable for a background scene or to match user taste.

According to the projection display device having the configuration of item (6), the difference between perceived distances of positions, separated from each other in the vertical direction, of an inclined virtual image can be made close to those of, for example, corresponding positions on the road surface of a road ahead as viewed from the eye point. This makes it possible to prevent the driver from feeling uncomfortable and to facilitate eye focus adjustment to a position difference.

According to the projection display device having the configuration of item (7), sufficiently strong light can be emitted from the second display panel along an inclined axis by illuminating it from the back side using the backlight.

To attain the second object, the invention provides projection display devices of the following items (8)-(12):

(8) A projection display device which outputs, from a projection unit, light that carries information including an arbitrary planar display image displayed in a prescribed display region and guides the light to a windshield of a vehicle or its vicinity so that the display image carried by the light reflected from a surface of the windshield or its vicinity is projected and visually recognized as a virtual image from a prescribed eye point, characterized in that:

an image forming plane of the virtual image is inclined with respect to a plane that is perpendicular to a line of sight that connects the eye point and the virtual image.

(9) The projection display device according to item (8), characterized in that:

a display panel which displays the display image is disposed in an inclined state, and the light that is output from the projection unit is produced using light that travels along an inclined axis that is inclined from a direction that is perpendicular to a surface of the display panel.

(10) The projection display device according to item (9), characterized in that the display panel is a transmission display panel, the projection display device further characterized by comprising:

an illumination backlight disposed behind the display panel.

(11) The projection display device according to item (9) or (10), characterized by further comprising an optical filter which is disposed on the front side of the display panel, the projection display device further characterized in that:

the optical filter selectively transmits the light that travels along the inclined axis that is inclined from the direction that is perpendicular to the surface of the display panel.

(12) The projection display device according to any one of items (8) to (11), characterized in:

that the virtual image is formed below a horizontal line passing through the eye point; and that the image forming plane of the virtual image is inclined in such a direction that a distance from the eye point to a top end of the virtual image is longer than a distance from the eye point to a bottom end of the virtual image.

In the projection display device having the configuration of item (8), since the image forming plane of a displayed virtual image is inclined from the plane that is perpendicular to the line of sight, there is a difference between the distance from the eye point (viewing point of the driver) to the top end of the virtual image and the distance from the eye point to the bottom end of the virtual image. That is, perspective, that is, depth, can be produced depending on the difference between the vertical positions of portions of the virtual image, without the need for displaying a 3D image elaborately. The perspective of the virtual image can be made equal to that of a real outside scene.

According to the projection display device having the configuration of item (9), since a virtual image is formed using light that travels in a direction that is inclined from the direction perpendicular to the surface of the display panel, the virtual image forming surface can be inclined from the plane that is perpendicular to the line of sight. That is, the virtual image forming surface can be inclined by disposing the display panel in an inclined state.

According to the projection display device having the configuration of item (10), sufficiently strong light can be emitted from the display panel along the inclined axis by illuminating it from the back side using the backlight.

According to the projection display device having the configuration of item (11), even in the case where the display panel is inclined, light that is necessary for display of a virtual image can be emitted efficiently along the inclined axis to enable display of a high-luminance virtual image.

According to the projection display device having the configuration of item (12), the difference between perceived distances of positions, separated from each other in the vertical direction, of an inclined virtual image can be made close to those of, for example, corresponding positions on the road surface of a road ahead as viewed from the eye point. This makes it possible to prevent the driver from feeling uncomfortable and to facilitate eye focus adjustment to a position difference.

To attain the third object, the invention provides projection display devices of the following items (13)-(17):

(13) A projection display device which outputs, from a projection unit, light that carries information including an arbitrary planar display image displayed in a prescribed display region and guides the light to a windshield of a vehicle or its vicinity so that the display image carried by the light reflected from a surface of the windshield or its vicinity is projected and visually recognized as a virtual image from a prescribed eye point, characterized by comprising:

an inclination adjustment mechanism which adjusts the direction of an image forming plane of the virtual image with respect to an optical axis, the projection display device further characterized in that:

the image forming plane whose direction has been adjusted by the inclination adjustment mechanism is inclined with respect to a plane that is perpendicular to a line of sight that connects the eye point and the virtual image.

(14) The projection display device according to item (13), characterized in:

that the inclination adjustment mechanism is connected to a support member that supports a display panel which displays the display image; and that in a state that the image forming plane is inclined, the light that is output from the projection unit is produced using light that travels along an inclined axis that is inclined from a direction that is perpendicular to a surface of the display panel.

(15) The projection display device according to item (13), characterized by further comprising an inclination control unit which positions the image forming plane of the virtual image so that it is inclined by a prescribed angle by driving the inclination adjustment mechanism if information to be displayed as the virtual image satisfies a predetermined display condition.

(16) The projection display device according to item (15), characterized in:

that the inclination control unit adjusts the inclination direction of the image forming plane of the virtual image to such a direction that a distance from the eye point to a top end of the virtual image is longer than a distance from the eye point to a bottom end of the virtual image in a case that the virtual image is formed below a horizontal line passing through the eye point.

(17) The projection display device according to item (14), characterized in that the display panel is a transmission display panel, the projection display device further characterized by further comprising:

an illumination backlight disposed behind the display panel.

In the projection display device having the configuration of item (13), by driving the inclination adjustment mechanism, the image forming plane of a virtual image can be inclined from the plane that is perpendicular to the line of sight that connects the eye point and the virtual image. As a result, a difference occurs between the distance from the eye point (viewing point of the driver) to the top end of the virtual image and the distance from the eye point to the bottom end of the virtual image. That is, perspective or depth can be produced depending on the difference between the vertical positions of portions of the virtual image, without the need for displaying a 3D image elaborately. The perspective of the virtual image can be made equal to that of a real outside scene by adjusting the inclination angle by means of the inclination adjustment mechanism.

According to the projection display device having the configuration of item (14), since a virtual image is formed using light that travels in a direction that is inclined from the direction perpendicular to the surface of the display panel, the virtual image forming surface can be inclined from the plane that is perpendicular to the line of sight. That is, the virtual image forming surface can be inclined by disposing the display panel in an inclined state.

According to the projection display device having the configuration of item (15), since perspective or depth can be adjusted automatically according to the content of a displayed virtual image, a display can be made that can be recognized intuitively or does not cause the driver to feel uncomfortable.

According to the projection display device having the configuration of item (16), the difference between perceived distances of positions, separated from each other in the vertical direction, of an inclined virtual image can be made close to those of, for example, corresponding positions on the road surface of a road ahead as viewed from the eye point. This makes it possible to prevent the driver from feeling uncomfortable and to facilitate eye focus adjustment to a position difference.

According to the projection display device having the configuration of item (17), sufficiently strong light can be emitted from the display panel along the inclined axis by illuminating it from the back side using the backlight.

Advantages of the Invention

According to the invention, the projection display devices having the configurations of the above items (1)-(7) can prevent reduction in legibility and enables display with perspective and depth while suppressing device cost increase. That is, they make it possible to display a virtual image with perspective and depth without the need for forming a 3D image elaborately and can easily switch to planar display to increase legibility.

The projection display devices having the configurations of the above items (8)-(12) can provide perspective that is suitable for an outside scene that appears at such a position as to be superimposed on or to be adjacent to a displayed image while suppressing device cost increase. That is, since the virtual image forming plane is inclined, desired perspective can be obtained without the need for forming a 3D image elaborately.

The projection display devices having the configurations of the above items (13)-(17) can provide perspective or depth that is suitable for an outside scene that appears at such a position as to be superimposed on or to be adjacent to a displayed image while suppressing device cost increase. That is, since the virtual image forming plane is inclined, desired perspective or depth can be obtained without the need for forming a 3D image elaborately. Low-cost devices can be realized because it is not necessary to draw a 3D image.

The invention has been described above concisely. The details of the invention will become more apparent when the modes for carrying out the invention (hereinafter referred to as embodiments) described below is read through with reference to the accompanying drawings.

DETAILED DESCRIPTION OF EMBODIMENTS

Vehicular projection display devices according to specific embodiments of the present invention will be hereinafter described with reference to the drawings.

Embodiment 1

Outline of Vehicular Projection Display Device

Figure 1:
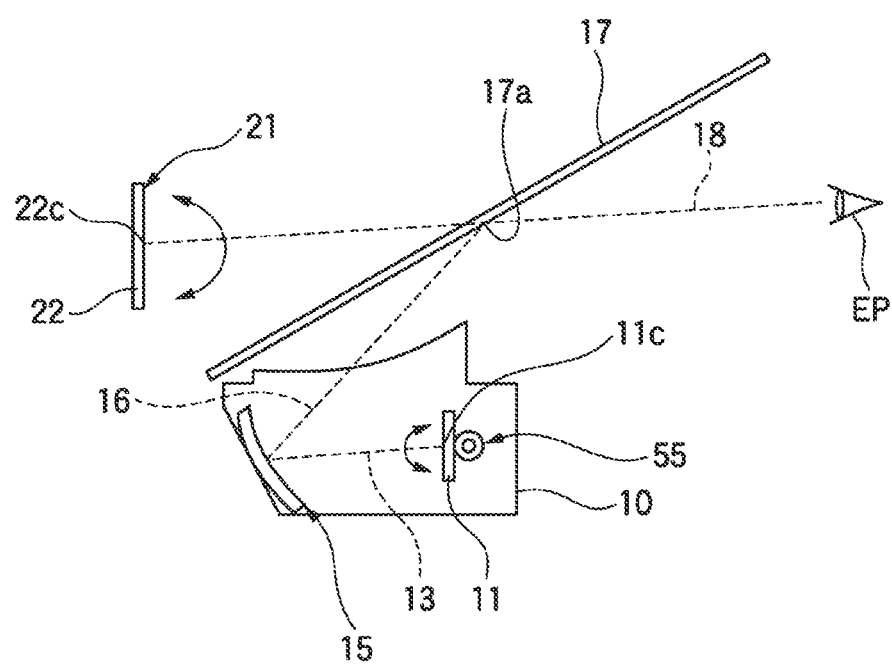
FIG. 1 is an optical path diagram showing a layout of individual units and optical paths of a vehicular projection display device according to each embodiment of the present invention in such a manner that a vehicle in which the vehicular projection display device is installed is viewed from its side.

FIG. 1 outlines a layout of individual units and optical paths of a vehicular projection display device according to a first embodiment of the invention in such a manner that a vehicle in which the vehicular projection display device is installed is viewed from its side. The vehicular projection display device according to this embodiment constitutes a head-up display (HUD) device.

An HUD display unit 10 shown in FIG. 1 is incorporated in a dashboard which is disposed in front of the driver seat of the vehicle. A 2D display panel 11 and a reflection mirror 15 are disposed inside the HUD display unit 10. The 2D display panel 11 has a screen on which visible information of any of various patterns such as numerical values, a text, and a figure can be displayed when necessary. For a specific example, the 2D display panel 11 can display, on the screen, a numerical value and characters such as "km/h" indicating a current display value of a speedometer of the vehicle. The 2D display panel 11 can emit exit light 13 that carries information including visible information being displayed on the screen.

The exit light 13 of the 2D display panel 11 goes toward the reflection mirror 15 and then is reflected by the its surface, whereby resulting exit light 16 going obliquely upward is output through an opening (not shown) of the HUD display unit 10. The reflection mirror 15 is part of an enlarging optical system. The exit light 16 that is output from the HUD display unit 10 is reflected by a certain region 17a of the windshield 17 of the vehicle and thereby directed to an eye point EP.

Therefore, when the driver, for example, of the vehicle looks forward along a line of sight 18 from the eye point EP, he or she can visually recognize a virtual image 21 in front of the region 17a of the windshield 17. That is, the virtual image 21 having the same content as the visible image displayed on the screen of the 2D display panel 11 is formed in a virtual image forming plane 22.

Therefore, when the driver of the vehicle looks forward along the line of sight 18 from the eye point EP, he or she can visually recognize the virtual image 21 of the image displayed on the HUD display unit 10 in such a manner that it is superimposed on an outside scene (e.g., a road surface or the hood of the own vehicle).

One of the features of the configuration shown in FIG. 1 is that the direction of the virtual image forming plane 22 is variable, that is, the virtual image forming plane 22 is rotatable about a rotation axis 22c. Therefore, the virtual image forming plane 22 can be oriented so as to be inclined with respect to the direction that is perpendicular to the line of sight 18.

To make the direction of the virtual image forming plane 22 variable, as shown in FIG. 1 the 2D display panel 11 is supported so as to be rotatable about a rotation axis 11c that is located approximately at the center of the 2D display panel 11. And an inclination adjustment mechanism 55 is connected to the 2D display panel 11. Driven by drive force of an electric motor (described later), the inclination adjustment mechanism 55 can set the direction of the surface of the 2D display panel 11 to any of various directions when necessary. The inclination adjustment mechanism 55 may be either a rotational mechanism or a link mechanism that moves linearly.

The virtual image forming plane 22 can be inclined by disposing the 2D display panel 11 in an inclined state. When the 2D display panel 11 is inclined, the optical axis for exit light 13 is inclined from the direction that is perpendicular to the surface of the 2D display panel 11.

Actual Manners of Arrangement of 2D Display Panel 11 and Virtual Image Forming Plane 22

Figure 2A:
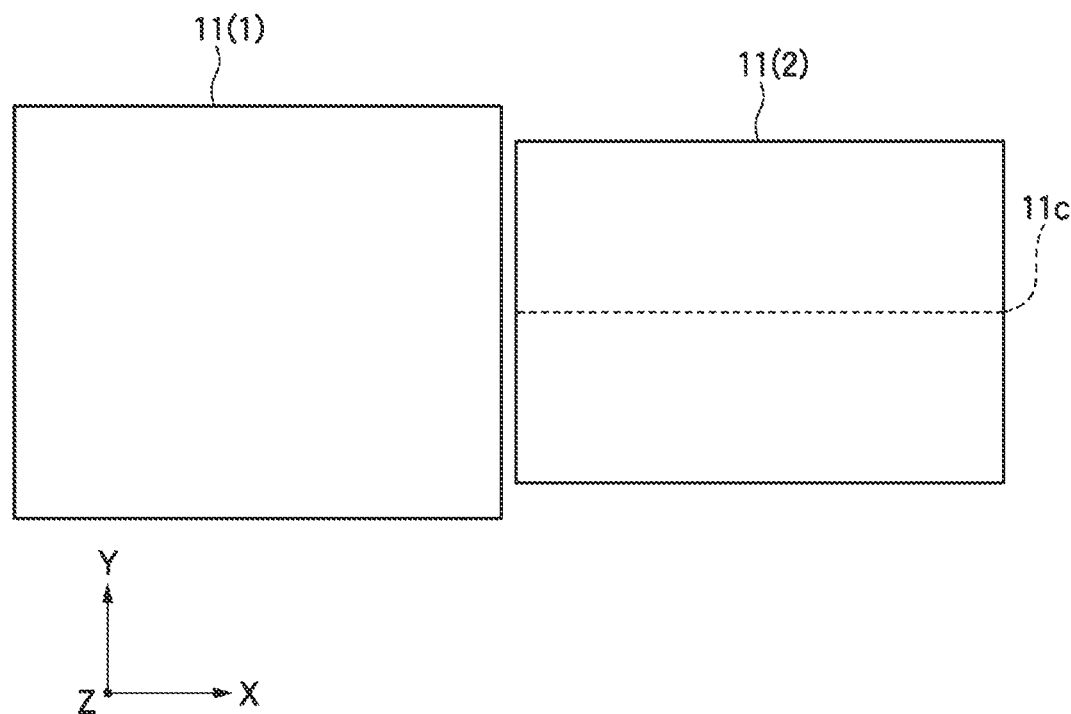
FIGS. 2A and 2B are a front view and a side view, respectively, showing how two 2D display panels are arranged in the vehicular projection display device according to a first embodiment.
Figure 2B:
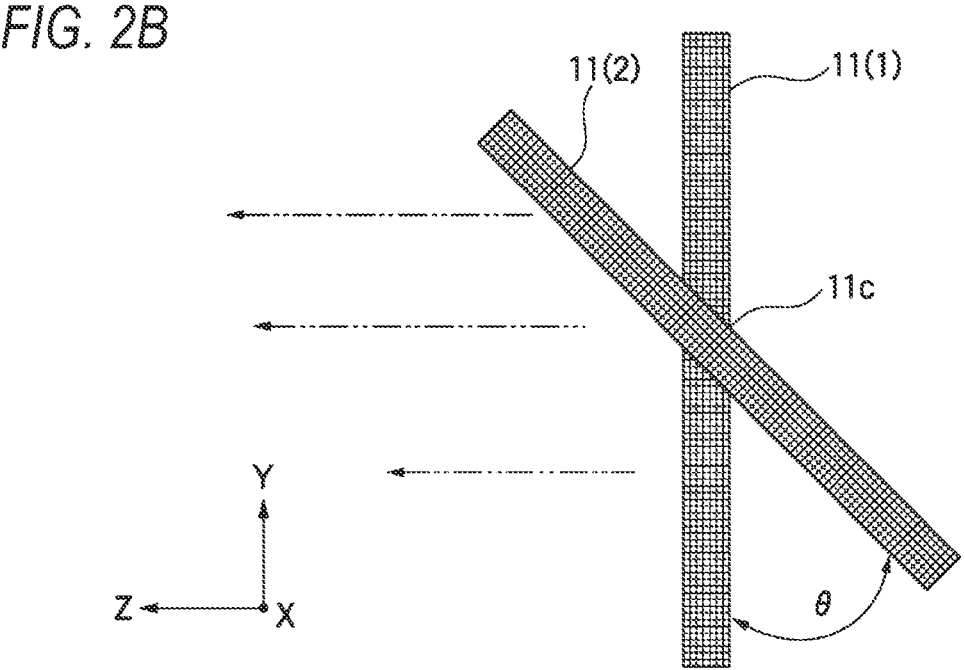

In the vehicular projection display device according to the embodiment, to enable display on two independent screens, two independent 2D display panels 11(1) and 11(2) are disposed to constitute the 2D display panel 11 shown in FIG. 1. FIGS. 2A and 2B are a front view and a side view, respectively, showing how the 2D display panels 11(1) and 11(2) are arranged.

Figure 3A:
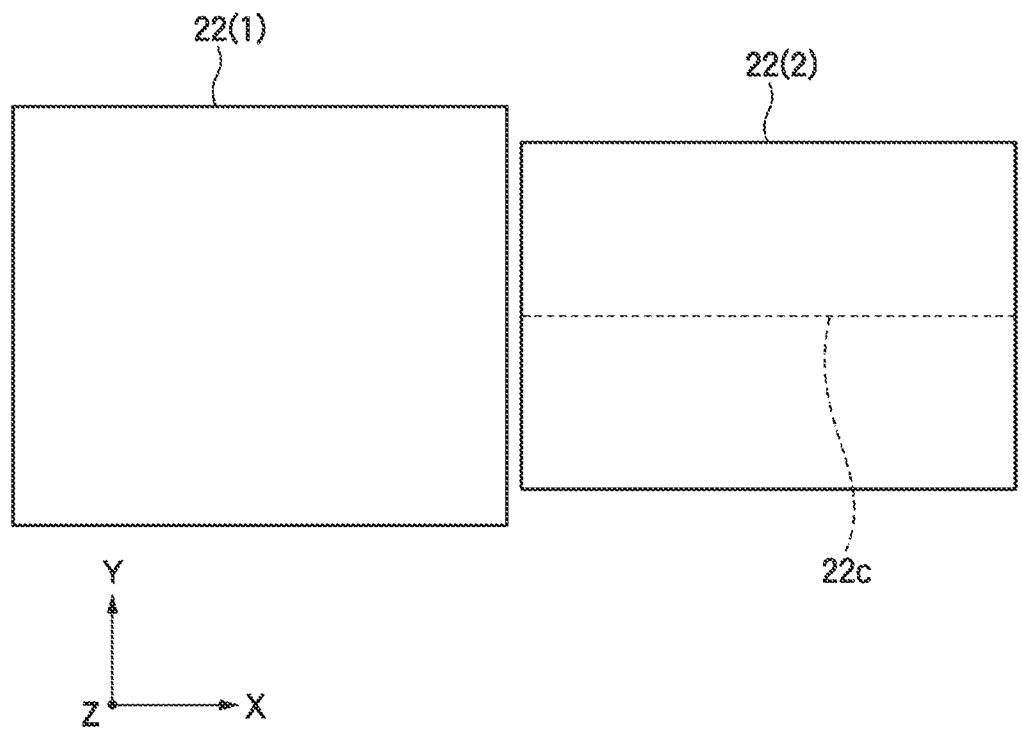
FIGS. 3A and 3B are a front view as viewed from the eye point side and a side view, respectively, showing how two image forming planes are arranged in the vehicular projection display device according to the first embodiment.
Figure 3B:
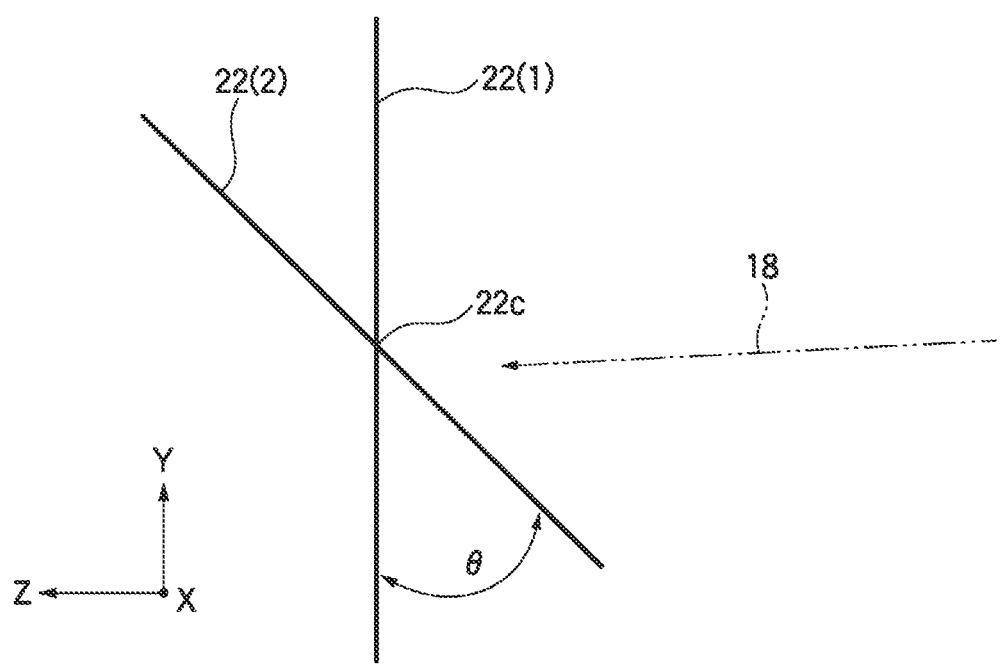

Because of the presence of the two 2D display panels 11(1) and 11(2), two independent virtual image forming planes 22(1) and 22(2) constitute the virtual image forming plane 22 shown in FIG. 1. FIGS. 3A and 3B are a front view as viewed from the eye point side and a side view, respectively, showing how the virtual image forming planes 22(1) and 22(2) are arranged.

As shown in FIG. 2A, the two 2D display panels 11(1) and 11(2) are juxtaposed in the horizontal direction (X direction). As shown in FIG. 2B, one 2D display panel 11(1) is disposed so that its surface is perpendicular to the optical axis direction (Z direction) and the other 2D display panel 11(2) is disposed so that its surface is inclined by an angle θ from the plane that is perpendicular to the optical axis direction.

As shown in FIG. 3A, the two virtual image forming planes 22(1) and 22(2) are juxtaposed in the horizontal direction (X direction). As shown in FIG. 3B, one virtual image forming plane 22(1) is disposed so as to be perpendicular to the line of sight 18 and the other virtual image forming plane 22(2) is disposed so as to be inclined by an angle θ from the plane that is perpendicular to the line of sight 18. The virtual image forming plane 22(1) is a plane on which an optical image corresponding to a displayed content of the 2D display panel 11(1) is formed, and the virtual image forming plane 22(2) is a plane on which an optical image corresponding to a displayed content of the 2D display panel 11(2) is formed.

In the embodiment, the direction of the 2D display panel 11(1) is fixed. Since as shown in FIG. 1 the inclination adjustment mechanism 55 is connected to the 2D display panel 11(2), the inclination angle θ of the 2 display panel 11(2) can be changed when necessary. The direction of the virtual image forming plane 22(1) is fixed to the direction that is perpendicular to the line of sight 18, and the inclination angle θ of the virtual image forming plane 22(2) is changed so as to correspond to the inclination angle of the 2D display panel 11(2).

Specific Example of Manner of Recognition by Driver

Figure 4:
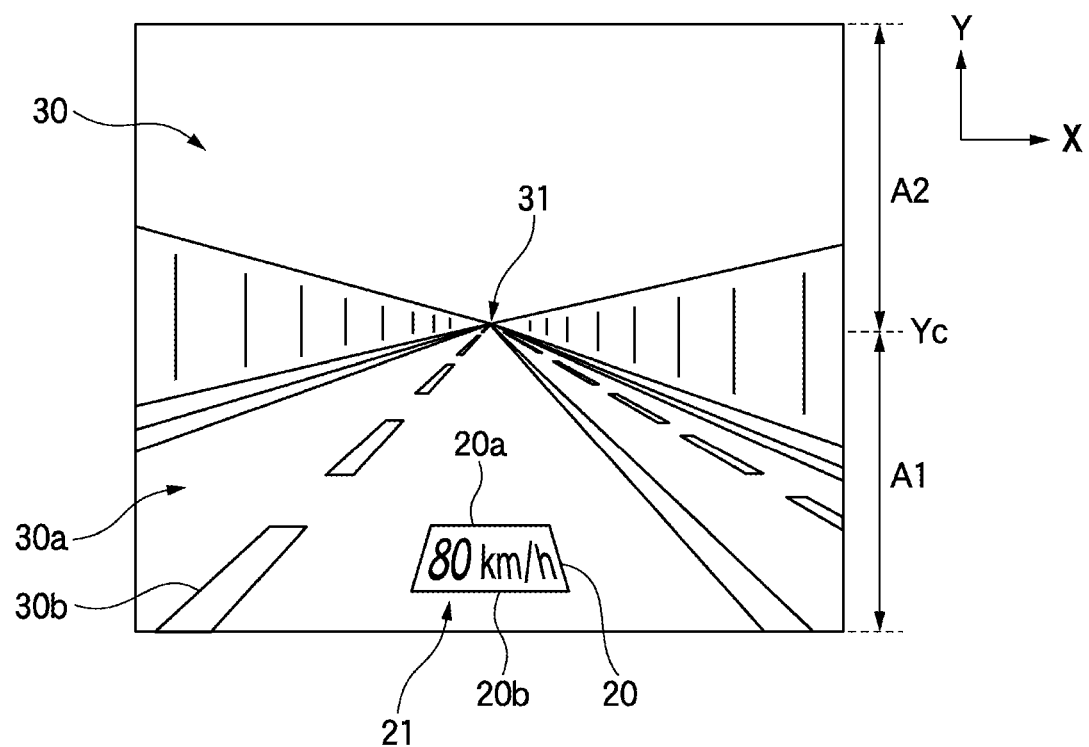
FIG. 4 is a view showing specific examples of a scene ahead of the vehicle and a displayed virtual image that can be visually recognized by the driver of the vehicle.

FIG. 4 shows specific examples of a scene ahead of the vehicle and a displayed virtual image that can be visually recognized by the driver of the vehicle. That is, the driver who is sitting on the driver seat of the vehicle can visually recognize, for example, a scene 30 shown in FIG. 4 through the transparent windshield 17. Furthermore, since the HUD display unit 10 shown in FIG. 1 is installed in the vehicle, at the same time the driver can also visually recognize, for example, a virtual image 21 that is displayed in an HUD display region 20 shown in FIG. 4.

Manner of Recognition of Outside Scene

As shown in FIG. 4, the scene 30 that is visually recognized by the driver includes a road surface 30a, lane marks 30b on the road surface 30a, etc. The scene 30 is visually recognized so as to converge at a point at infinity 31 that is located ahead on the road. For example, in area A1 that is defined by the bottom line of an overall area that is visually recognized by the driver and a horizontal line passing through the point at infinity 31 and located at a vertical position Yc, the widths of the road surface 30a and the lane marks 30b become smaller as the position goes upward. This indicates that the distance to the object increases as its position goes upward. On the other hand, in area A2 that is defined by the horizontal line located at the vertical position Yc and a top line of the overall area recognized by the driver, the driver recognizes that the distance to the object increases as its position goes downward. In an ordinary state, the point at infinity 31 is a far point that occurs when the driver looks forward horizontally from the eye point EP.

Manner of Recognition of Virtual Image

In a state that the virtual image forming plane 22 shown in FIG. 1 is inclined from the plane that is perpendicular to the line of sight 18, as shown in FIG. 4 the HUD display region 20 in which a virtual image 21 is displayed is shaped like a trapezoid. In the example of FIG. 4, the width in the X direction of a top line 20a of the region 20 is shorter than that of its bottom line 20b. Therefore, the shape of the HUD display region 20 causes the driver to feel the same sense of distance as he or she would feel when viewing the scene 30 which converges at the point at infinity 31.

In actuality, the HUD display region 20 shown in FIG. 4 corresponds to the virtual image forming plane 22(2) shown in FIGS. 3A and 3B. That is, when the virtual image forming plane 22(2) is inclined as shown in FIGS. 3A and 3B, the top line 20a of the HUD display region 20 is more distant from the eye point EP than its bottom line 20b is and hence the virtual image 21 that is formed on the inclined HUD display region 20 can really provide perspective and depth.

Furthermore, the perspective of the virtual image 21 obtained by the inclination of the virtual image forming plane 22 appears in the same direction as that of a nearby portion of the scene 30. That is, both of the virtual image 21 and the scene 30 are such as to cause the driver to feel that the object goes away from him or her as the position goes closer to the point at infinity 31. As a result, the driver is less prone to feel uncomfortable in terms of visual sense and can easily make eye focus adjustment.

Example Configuration (1) of 2D Display Panel 11

Figure 5:
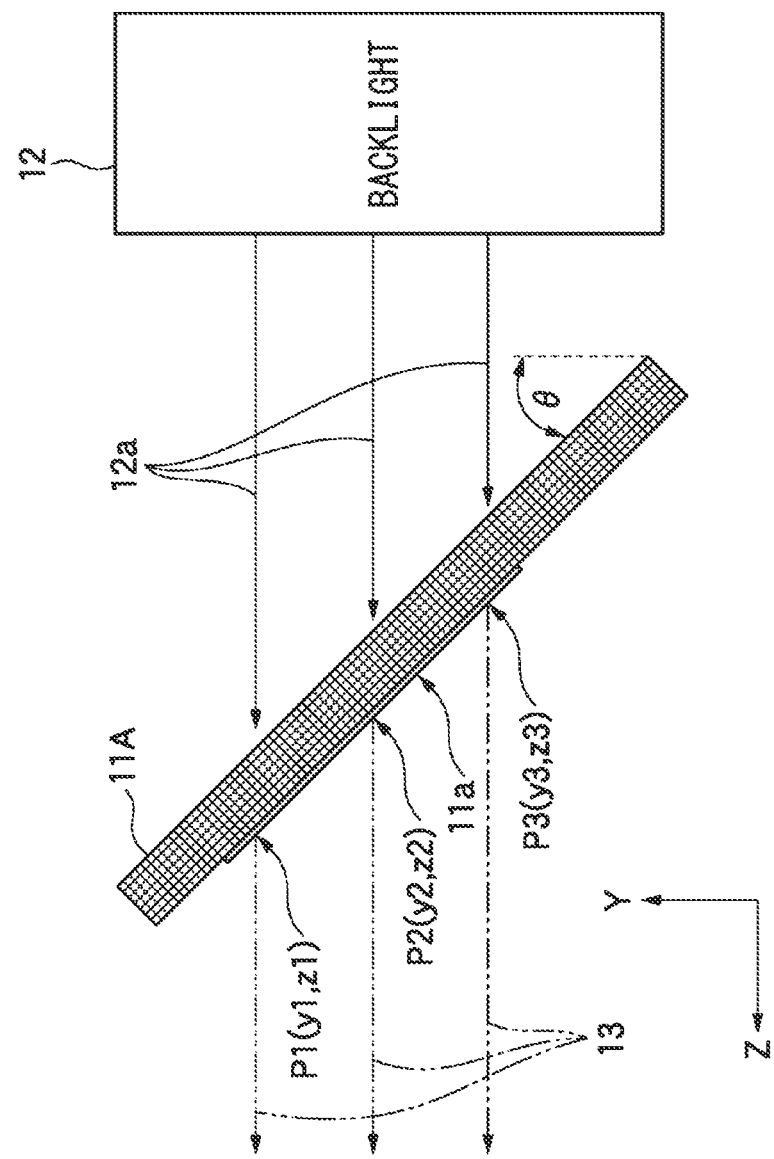
FIG. 5 shows an example configuration (1) of a 2D display panel that can be employed in the vehicular projection display device shown in FIG. 1 and a unit neighboring it.

FIG. 5 shows an example configuration (1) of a 2D display panel that can be employed in the vehicular projection display device shown in FIG. 1 and a unit neighboring it.

In the configuration shown in FIG. 5, a flat-panel transmission liquid crystal display panel 11A is employed as the 2D display panel 11(2). A backlight 12 is disposed behind the transmission liquid crystal display panel 11A.

In the configuration of FIG. 5, the surface of the flat-panel transmission liquid crystal display panel 11A is positioned by the inclination adjustment mechanism 55 so as to be inclined from the vertical direction (Y axis) by a prescribed angle θ. The backlight 12 emits illumination light 12a (e.g., white light) in the Z-axis direction. In passing through the transmission liquid crystal display panel 11A, the illumination light 12a is modulated in density and color according to the content of a displayed image 11a and becomes exit light 13 that goes in the Z direction.

Where the transmission liquid crystal display panel 11A is inclined as shown in FIG. 5, points P1, P2, and P3 that are located at different positions in the displayed image 11a deviate from each other in the Z-axis direction. That is, coordinates (y1,z1) of point P1, coordinates (y2, z2) of point P2, and coordinates (y3, z3) of point P3 have differences in the optical axis direction (Z direction).

Since the positions in the Z direction of points P1, P2, and P3 that serve as light source points in displaying, for example, the virtual image 21 shown in FIG. 1 are different from each other, the virtual image forming plane 22(2) is inclined like the transmission liquid crystal display panel 11A. That is, by disposing the transmission liquid crystal display panel 11A in an inclined state and emitting exit light 13 in a direction (Z direction) that is inclined from the direction perpendicular to the surface of the transmission liquid crystal display panel 11A, a virtual image 21 can be displayed in the virtual image forming plane 22(2) that is inclined. The depth of the virtual image 21 can be changed by adjusting the inclination angle θ of the transmission liquid crystal display panel 11A.

Example Configuration (2) of 2D Display Panel 11

Figure 6:
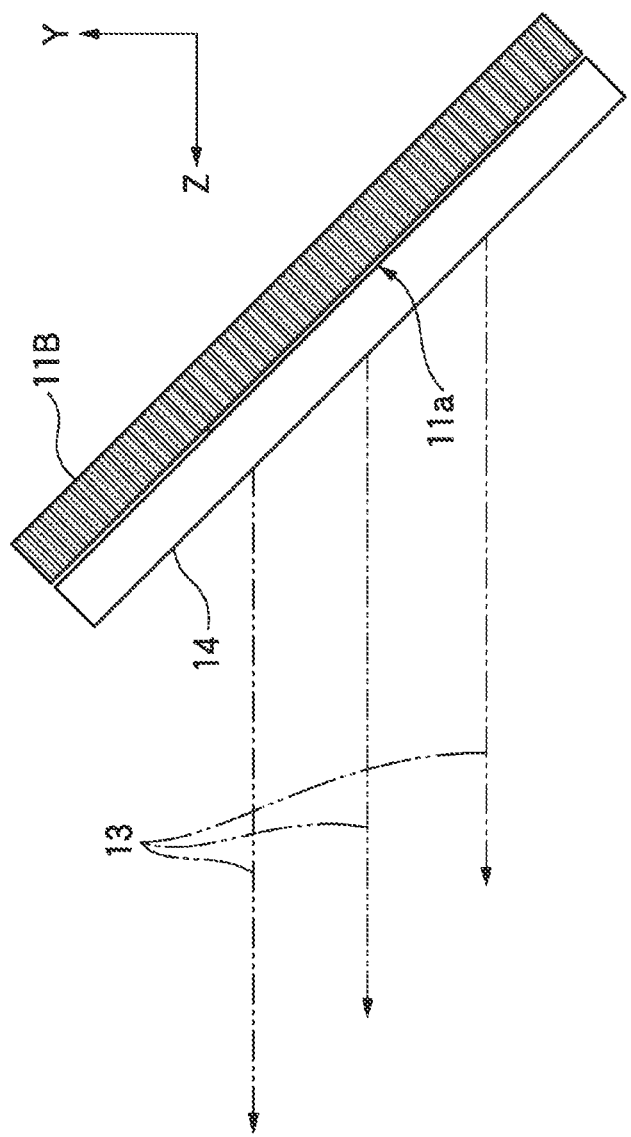
FIG. 6 shows an example configuration (2) of a 2D display panel that can be employed in the vehicular projection display device shown in FIG. 1 and a member neighboring it.

FIG. 6 shows an example configuration (2) of a 2D display panel that can be employed in the vehicular projection display device shown in FIG. 1 and a member neighboring it.

In the configuration of FIG. 6, a spontaneous emission display panel 11B is employed as the 2D display panel 11(2). More specifically, the spontaneous emission display panel 11B can be an organic EL display panel. As in the configuration of FIG. 5, the surface of the flat-panel spontaneous emission display panel 11B is positioned being inclined from the vertical direction (Y axis) by a prescribed angle θ.

In the configuration of FIG. 6, an optical filter 14 is attached to the front surface of the spontaneous emission display panel 11B. The optical filter 14 provides a function that is necessary for producing, from a displayed image 11a, exit light 13 that goes in the Z-axis direction. In a specific example, an optical member having direction selectivity is used as the optical filter 14, whereby the optical filter 14 is given such a property as to transmit light traveling in the Z direction and stop light traveling in the other directions. This prevents superfluous light other than the exit light 13 from going toward the reflection mirror 15.

Where the viewing angle of the spontaneous emission display panel 11B is relatively narrow, an optical member that refracts light is used as the optical filter 14 to refract light so that the maximum intensity direction (usually, it is perpendicular to its surface) of exit light from the spontaneous emission display panel 11B is inclined and coincides with the Z direction. As a result, the light quantity of the exit light 13 can be increased and the legibility of the virtual image 21 can be made higher.

When the spontaneous emission display panel 11B is positioned so that its surface becomes parallel with the Y axis, to prevent exit light 13 from attenuating being affected by the optical filter 14, it is necessary to dislocate the optical filter 14 from the position where it is opposed to the spontaneous emission display panel 11B or to adjust the orientation of the optical filter 14.

The 2D display panel 11(1) may be configured in the same manner as the 2D display panel 11(2). However, since it is not necessary to incline the 2D display panel 11(1) with respect to the optical axis for exit light, a 2D display panel having an ordinary configuration can be used as it is as the 2D display panel 11(1).

Configuration of Example System

Figure 7:
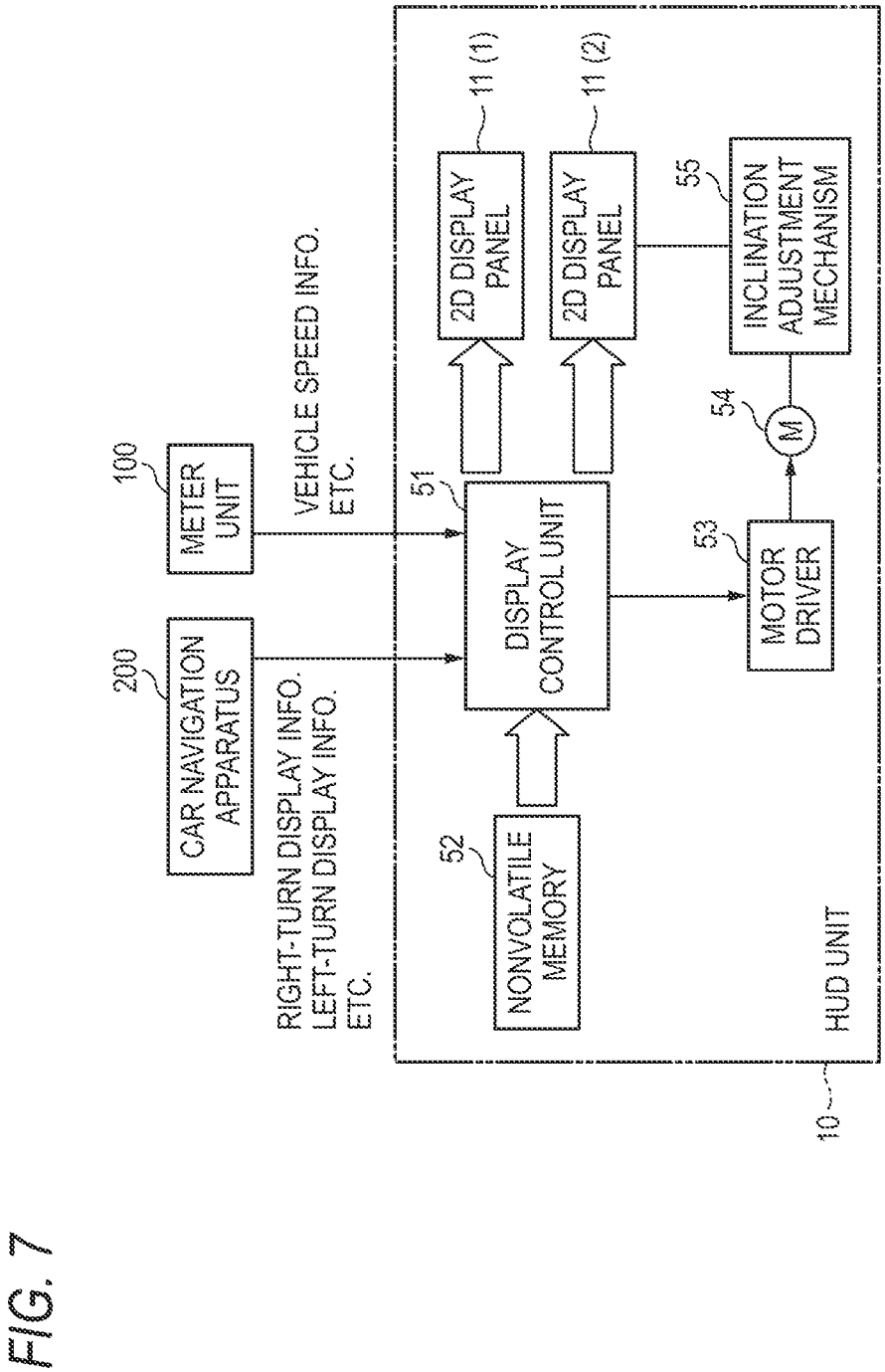
FIG. 7 is a block diagram showing the configuration of an example system including the vehicular projection display device according to the first embodiment.

FIG. 7 shows the configuration of an example system including the vehicular projection display device shown in FIG. 1. The system shown in FIG. 7 is equipped with, in addition to the HUD display unit 10, a meter unit 100 and a car navigation apparatus 200 which are installed in the vehicle.

The meter unit 100 incorporates meters as typified by a speedometer and various display devices. For example, where the HUD display unit 10 shown in FIG. 7 is to display a vehicle speed in the form of a virtual image 21, vehicle speed information that is output from the meter unit 100 is input to the HUD display unit 10.

The car navigation apparatus 200 recognizes a current position of the self vehicle and displays a map including the current position on a prescribed screen, and can thereby guide the driver so that he or she can drive the vehicle along a predetermined movement route. The car navigation apparatus 200 has a turn-by-turn guidance function. For example, when the current position of the self vehicle is approaching an intersection or the like on a movement route, the turn-by-turn guidance function makes it possible to announce an appropriate movement direction in the form of, for example, a voice and display of an arrow. In giving left-turn or right-turn guidance by means of the turn-by-turn guidance function, the car navigation apparatus 200 shown in FIG. 7 outputs information about left-turn or right-turn display to the HUD display unit 10.

The HUD display unit 10 shown in FIG. 7 is equipped with a display control unit 51, a nonvolatile memory 52, a motor driver 53, an electric motor 54, and the inclination adjustment mechanism 55.

The display control unit 51, which is a microcomputer, can realize various control functions necessary for the HUD display unit 10 by running programs that are stored therein in advance. The display control unit 51 can perform a data communication with each of the meter unit 100 and the car navigation apparatus 200.

The nonvolatile memory 52 is stored in advance with fixed data of various display patterns to be displayed on the screens of the 2D display panels 11(1) and 11(2) and data of various constants that are necessary for controls by the display control unit 51. For example, when the HUD display unit 10 is to make a right-turn guidance display on the basis of an output of the car navigation apparatus 200, the display control unit 51 reads data of a right-turn guidance display pattern from the nonvolatile memory 52 and makes a right-turn guidance display (see FIG. 9B) on the screen of the 2D display panel 11(2).

When it is necessary to adjust the inclination angle of the surface of the 2D display panel 11(2), the display control unit 51 drives the electric motor 54 via the motor driver 53. As a result, the inclination adjustment mechanism 55 which is connected to the electric motor 54 is driven and the inclination angle of the 2D display panel 11(2) is changed.

Characteristic Control Operation

Figure 8:
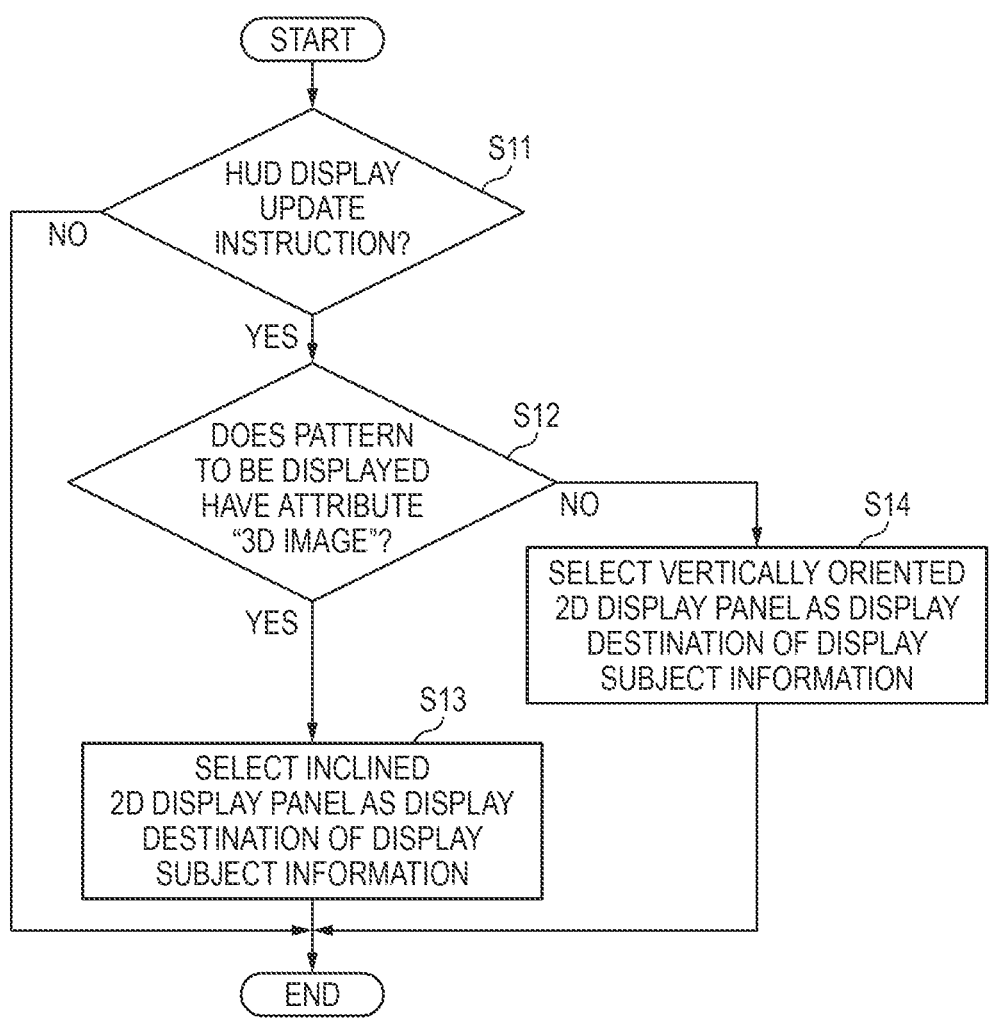
FIG. 8 is a flowchart of a main operation of the vehicular projection display device according to the first embodiment.

FIG. 8 shows the procedure of a characteristic, main control operation of the vehicular projection display device shown in FIG. 1. That is, the characteristic control operation can be realized by the display control unit 51's executing the process of FIG. 8 on a regular basis, for example. The details of the process of FIG. 8 will be described below.

At step S11, the display control unit 51 judges whether an instruction to update the HUD display has been received or not. For example, if display information having higher display priority than the information currently displayed on the screens of the 2D display panels 11(1) and 11(2) has been input from the meter unit 100 or the car navigation apparatus 200, the display control unit 51 judges that an update instruction has been received and moves to step S12.

At step S12, the display control unit 51 judges whether the attribute of the pattern to be displayed is "3D image" or not.

Patterns whose display in the form of planar images is desirable, such as a numerical value representing a vehicle speed, are given an attribute "planar image." And patterns whose display in the form of 3D images is desirable, such as arrow patterns for right-turn guidance and left-turn guidance, are given an attribute "3D image." Such attribute data are determined in advance and registered in the nonvolatile memory 52. Alternatively, the meter unit 100 or the car navigation apparatus 200 sends display information containing attribute information to the HUD display unit 10.

Therefore, the display control unit 51 can recognize an attribute by referring to corresponding information stored in the nonvolatile memory 52 or externally input attribute information. The process moves to step S13 if a pattern having the attribute "3D image" is to be displayed, and to step S14 if a pattern having the attribute "planar image" is to be displayed.

At step S13, the display control unit 51 selects the inclined 2D display panel 11(2) as a display destination of the display subject information that has been input from the meter unit 100 or the car navigation apparatus 200 and draws a display pattern that is read from the nonvolatile memory 52 on the display panel 11(2).

At step S14, the display control unit 51 selects the vertically oriented 2D display panel 11(1) as a display destination of the display subject information that has been input from the meter unit 100 or the car navigation apparatus 200 and draws a display pattern that is read from the nonvolatile memory 52 on the display panel 11(1).

Specific Display Examples

Figure 9A:
FIGS. 9A and 9B show specific example images to be displayed on the screens of the left-hand 2D display panel 11(1) and the right-hand 2D display panel 11(2), respectively.
Figure 9B:
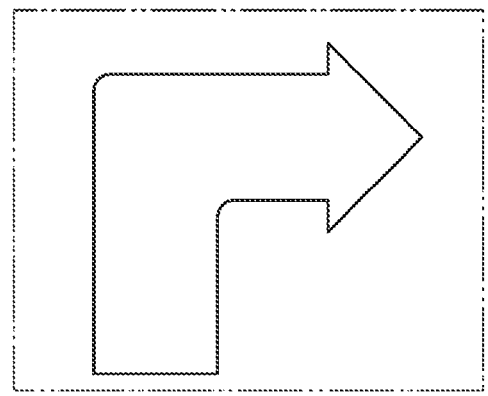
Figure 9C:
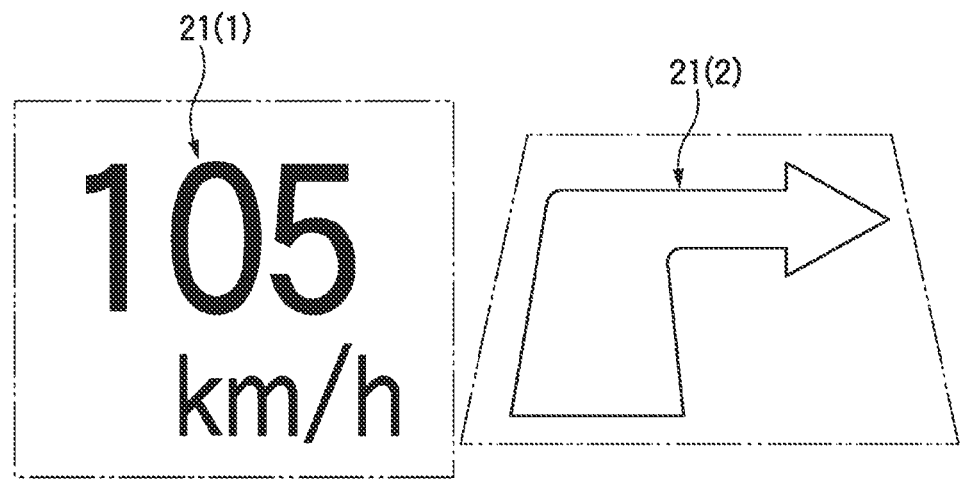
FIG. 9C is a view, as viewed from the eye point side, showing specific examples of virtual images projected on the two respective virtual image forming planes.

FIGS. 9A and 9B show specific example images to be displayed on the screens of the 2D display panels 11(1) and 11(2) by the HUD display unit 10, respectively. FIG. 9C shows how virtual images 21(1) and 21(2) formed in the respective virtual image forming planes 22(1) and 22(2) are visually recognized when viewed from the eye point EP side.

For example, when vehicle speed information "105 km/h" of the speedometer is input to the display control unit 51 of the HUD display unit 10 from the meter unit 100, if the vehicle speed information is assigned the attribute "planar image," a display pattern "105 km/h" is displayed on the screen of the 2D display panel 11(1) in the manner shown in FIG. 9A as a result of execution of step S14 (see FIG. 8).

When a right-turn guidance display instruction is input to the display control unit 51 of the HUD display unit 10 from the car navigation apparatus 200, if the instruction is assigned the attribute "3D image," a right-turn arrow pattern is displayed on the screen of the 2D display panel 11(2) in the manner shown in FIG. 9B as a result of execution of step S13 (see FIG. 8).

In the above situation, the display pattern "105 km/h" being displayed on the screen of the 2D display panel 11(1) and the right-turn arrow pattern being displayed on the screen of the 2D display panel 11(2) are displayed as virtual images 21 in the virtual image forming planes 22(1) and 22(2), respectively. Therefore, at the eye point EP the driver visually recognizes the virtual images 21 in the manners shown in FIG. 9C.

That is, since the virtual image forming plane 22(1) is oriented so as to be perpendicular to the line of sight 18, the virtual image 21(1) is displayed in the virtual image forming plane 22(1) in a planar display form like the image displayed on the 2D display panel 11(1). Since the virtual image forming plane 22(2) is inclined from the direction that is perpendicular to the line of sight 18, the virtual image 21(2) is displayed in the virtual image forming plane 22(2) in a different form than the image displayed on the 2D display panel 11(2), that is, with perspective (actual depth).

By displaying numerical value information such as a vehicle speed in the form of a planar image like the virtual image 21(1) shown in FIG. 9C, the legibility in reading the numerical value is made high enough to allow the driver to read it instantaneously.

By displaying such a pattern as an arrow or a figure like the virtual image 21(2) shown in FIG. 9C with perspective and depth, the driver can visually recognize it with the same depth as a background road surface etc. This makes it possible to prevent the driver from feeling uncomfortable in visual sense and to cause the driver to feel a high-grade sense. In addition, merely displaying a planar pattern in the manner shown in FIG. 9B can realize a display with depth like the virtual image 21(2) shown in FIG. 9C.

That is, by using the two 2D display panels 11(1) and 11(2) in different manners, a planar virtual image 21(1) for which importance is attached to legibility or a virtual image 21(2) with depth can be displayed selectively. Pieces of display information can be allocated to the two screens automatically by performing the control shown in FIG. 8.

Possible Modifications

The 2D display panel 11 may be a reflection display panel rather than a transmission type or spontaneous emission type one.

Whereas in the example of FIG. 4 the HUD display region 20 and the scene 30 are superimposed on each other, the layout may be changed so that a combiner (reflection plate) is disposed adjacent to the windshield 17, for example, on the dashboard and a virtual image 21 appears in a combiner region.

In the example of FIG. 4, since the HUD display region 20 is located above the position Yc corresponding to the point at infinity 31, the inclination direction of the virtual image forming plane 22 is determined so that the top line 20a of the HUD display region 20 is more distant from the eye point EP than its bottom line 20b. Conversely, where the HUD display region 20 is located above the position Yc, it would be proper to determine the inclination direction of the virtual image forming plane 22 so that its bottom line 20b is more distant from the eye point EP than its top line 20a.

In the process of FIG. 8, the directions of the 2D display panels 11(1) and 11(2) are not changed. However, for certain kinds of display patterns or certain situations of scenes on which the virtual image display region is to be superimposed, it is conceivable to adjust the inclination angle of the 2D display panel 11(2) to various values automatically. Another configuration is possible in which the inclination angle of the 2D display panel 11(2) is fine-adjusted according to user taste in response to a manual adjustment instruction that is issued using a button or the like for receiving a user input.

Whereas in the example of FIGS. 3A and 3B the two virtual image forming planes 22(1) and 22(2) are juxtaposed in the horizontal direction, the virtual image forming planes 22(1) and 22(2) may be juxtaposed in the vertical direction. Furthermore, the two virtual image forming planes 22(1) and 22(2) may be disposed at positions that are distant from each other.

The HUD display unit 10 may be configured so that not only the direction of the 2D display panel 11(2) but also the direction of the 2D display panel 11(1) can be adjusted. In this case, the two virtual image forming planes 22(1) and 22(2) can be given different inclination angles by controlling the inclination angles of 2D display panels 11(1) and 11(2) independently of each other. For example, even in the case where the virtual image forming planes 22(1) and 22(2) are disposed in the area A1 and area A2 shown in FIG. 4, respectively, virtual images 21 with depth can be displayed in the respective areas A1 and A2 so as to conform to a scene 30.

Features of the vehicular projection display device according to the first embodiment of the invention will be summarized concisely as the following items (1)-(7):

(1) A vehicular projection display device which outputs, from a projection unit, light that carries information including an arbitrary planar display image displayed in a prescribed display region and guides the light to a windshield (17) of a vehicle or its vicinity so that the display image carried by the light reflected from a surface of the windshield or its vicinity is projected and visually recognized as a virtual image from a prescribed eye point (EP), characterized in:

that a first image forming plane (22(1)) and a second image forming plane (22(2)) are provided as image forming planes of the virtual image (virtual image forming plane 22);

that the first image forming plane is disposed approximately parallel with a plane that is perpendicular to a line of sight (18) that connects the eye point and the virtual image (21);

that the second image forming plane is inclined with respect to the plane that is perpendicular to the line of sight that connects the eye point and the virtual image (see FIGS. 1 and 3).

(2) The vehicular projection display device according to item (1), characterized by comprising:

a first 2D display panel (11(1)) for formation of a virtual image in the first image forming plane; and a second 2D display panel (11(2)) for formation of a virtual image in the second image forming plane, the vehicular projection display device further characterized in:

that the first 2D display panel is disposed so as to be approximately perpendicular to an optical axis for exit light;

that the second 2D display panel is disposed so as to be inclined from an optical axis for exit light; and that the projection unit outputs light beams for formation of the virtual images on the basis of the exit light of the first 2D display panel and the exit light of the second 2D display panel (see FIG. 2).

(3) The vehicular projection display device according to item (2), characterized by further comprising a virtual image display control unit (display control unit 51) which judges a type of display subject information when receiving it from outside, and selects the first 2D display panel or the second 2D display panel as an output destination of the display subject information (S12-S14) (see FIGS. 7 and 8).

(4) The vehicular projection display device according to item (3), characterized in that the virtual image display control unit selects the first 2D display panel as the output destination of the display subject information if the received display subject information is assigned a planar display attribute, and selects the second 2D display panel as the output destination of the display subject information if the received display subject information is assigned a 3D display attribute (S12-S14).

(5) The vehicular projection display device according to item (1), characterized by further comprising an inclination adjustment mechanism (55) which adjusts the inclination angle of the second image forming plane.

(6) The vehicular projection display device according to item (1), characterized in that the second image forming plane (22(2)) is inclined in such a direction that a distance from the eye point to a top end of the virtual image is longer than a distance from the eye point to a bottom end of the virtual image in a case that the virtual image is formed below a horizontal line passing through the eye point (see FIG. 3B).

(7) The vehicular projection display device according to item (2), characterized in that the second 2D display panel is a transmission display panel (transmission liquid crystal display panel 11A), the vehicular projection display device further characterized by further comprising:

an illumination backlight (12) disposed behind the second 2D display panel (see FIG. 5).

Embodiment 2

Specific Example of Manner of Recognition by Driver

FIG. 4 shows specific examples of a scene ahead of the vehicle and a displayed virtual image that can be visually recognized by the driver of the vehicle. That is, the driver who is sitting on the driver seat of the vehicle can visually recognize, for example, a scene 30 shown in FIG. 4 through the transparent windshield 17. Furthermore, since the HUD display unit 10 shown in FIG. 1 is installed in the vehicle, at the same time the driver can also visually recognize, for example, a virtual image 21 that is displayed in an HUD display region 20 shown in FIG. 4.

Manner of Recognition of Outside Scene

As shown in FIG. 4, the scene 30 that is visually recognized by the driver includes a road surface 30a, lane marks 30b on the road, etc. The scene 30 is visually recognized so as to converge at a point at infinity 31 that is located ahead on the road. For example, in area A1 that is defined by the bottom line of an overall area that is visually recognized by the driver and a horizontal line passing through the point at infinity 31 and located at a vertical position Yc, the widths of the road surface 30a and the lane marks 30b become smaller as the position goes upward. This indicates that the distance to the object increases as its position goes upward. On the other hand, in area A2 that is defined by the horizontal line located at the vertical position Yc and a top line of the overall area recognized by the driver, the driver recognizes that the distance to the object increases as its position goes downward. In an ordinary state, the point at infinity 31 is a far point that occurs when the driver looks forward horizontally from the eye point EP.

Manner of Recognition of Virtual Image

As shown in FIG. 4, the HUD display region 20 in which a virtual image 21 is displayed is shaped like a trapezoid. That is, the width in the X direction of a top line 20a of the region 20 is shorter than that of its bottom line 20b. Therefore, the shape of the HUD display region 20 causes the driver to feel the same sense of distance as he or she would feel when viewing the scene 30 which converges at the point at infinity 31.

In actuality, the HUD display region 20 shown in FIG. 4 corresponds to the virtual image forming plane 22 in FIG. 1. That is, the top line 20a of the HUD display region 20 is more distant from the eye point EP than its bottom line 20b is and hence the virtual image 21 that is formed on the inclined HUD display region 20 can really provide perspective.

Furthermore, the perspective of the virtual image 21 obtained by the inclination of the virtual image forming plane 22 appears in the same direction as that of a nearby portion of the scene 30. That is, both of the virtual image 21 and the scene 30 are such as to cause the driver to feel that the object goes away from him or her as the position goes closer to the point at infinity 31. As a result, the driver is less prone to feel uncomfortable in terms of visual sense and can easily make eye focus adjustment.

Example Configuration (3) of 2D Display Panel 11

An example configuration (3) of a 2D display panel that can be employed in the vehicular projection display device shown in FIG. 1 and a unit neighboring it will be described below with reference to FIG. 5.

In the configuration shown in FIG. 5, a transmission liquid crystal display panel 11A is employed as the 2D display panel 11. A backlight 12 is disposed behind the transmission liquid crystal display panel 11A.

As shown in FIG. 5, the surface of the flat-panel transmission liquid crystal display panel 11A is fixed being inclined from the vertical direction (Y axis) by a prescribed angle θ. The backlight 12 emits illumination light 12a (e.g., white light) in the Z-axis direction. In passing through the transmission liquid crystal display panel 11A, the illumination light 12a is modulated in density and color according to the content of a displayed image 11a and becomes exit light 13 that goes in the Z direction.

Since the transmission liquid crystal display panel 11A is inclined, points P1, P2, and P3 that are located at different positions in the displayed image 11a deviate from each other in the Z-axis direction. That is, coordinates (y1, z1) of point P1, coordinates (y2, z2) of point P2, and coordinates (y3, z3) of point P3 have differences in the optical axis direction (Z direction).

Since the positions in the Z direction of points P1, P2, and P3 that serve as light source points in displaying, for example, the virtual image 21 shown in FIG. 1 are different from each other, the virtual image forming plane 22 is inclined like the transmission liquid crystal display panel 11A. That is, by disposing the transmission liquid crystal display panel 11A in an inclined state and emitting exit light 13 in a direction (Z direction) that is inclined from the direction perpendicular to the surface of the transmission liquid crystal display panel 11A, a virtual image 21 can be displayed in the virtual image forming plane 22 that is inclined.

Example Configuration (4) of 2D Display Panel 11

An example configuration (4) of a 2D display panel that can be employed in the vehicular projection display device shown in FIG. 1 and a member neighboring it will be described below with reference to FIG. 6.

In the configuration of FIG. 6, a spontaneous emission display panel 11B is employed as the 2D display panel 11. More specifically, the spontaneous emission display panel 11B can be an organic EL display panel. As in the configuration of FIG. 5, the surface of the flat-panel spontaneous emission display panel 11B is fixed being inclined from the vertical direction (Y axis) by a prescribed angle θ.

In the configuration of FIG. 6, an optical filter 14 is attached to the front surface of the spontaneous emission display panel 11B. The optical filter 14 provides a function that is necessary for producing, from a displayed image 11a, exit light 13 that goes in the Z-axis direction. In a specific example, an optical member having direction selectivity is used as the optical filter 14, whereby the optical filter 14 is given such a property as to transmit light traveling in the Z direction and stop light traveling in the other directions. This prevents superfluous light other than the exit light 13 from going toward the reflection mirror 15.

Where the viewing angle of the spontaneous emission display panel 11B is relatively narrow, an optical member that refracts light is used as the optical filter 14 to refract light so that the maximum intensity direction (usually, it is perpendicular to its surface) of exit light from the spontaneous emission display panel 11B is inclined and coincides with the Z direction. As a result, the light quantity of the exit light 13 can be increased and the legibility of the virtual image 21 can be made higher.

Possible Modifications

In the vehicular projection display device according to this embodiment, it is assumed that the position and the inclination angle of the 2D display panel 11 is fixed. Alternatively, an adjustment mechanism may be provided so that the position and the inclination angle can be adjusted manually as appropriate. This makes it possible to adjust the display position of a virtual image 21 according to a change in the position of the eye point EP or to adjust the perspective (depth) of a virtual image 21 according to the taste of a user (driver).

The 2D display panel 11 may be a reflection display panel rather than a transmission type or spontaneous emission type one.

Whereas in the example of FIG. 4 the HUD display region 20 and the scene 30 are superimposed on each other, the layout may be changed so that a combiner (reflection plate) is disposed adjacent to the windshield 17, for example, on the dashboard and a virtual image 21 appears in a combiner region.

In the example of FIG. 4, since the HUD display region 20 is located above the position Yc corresponding to the point at infinity 31, the inclination direction of the virtual image forming plane 22 is determined so that the top line 20a of the HUD display region 20 is more distant from the eye point EP than its bottom line 20b. Conversely, where the HUD display region 20 is located above the position Yc, it would be proper to determine the inclination direction of the virtual image forming plane 22 so that its bottom line 20b is more distant from the eye point EP than its top line 20a.

Features of the vehicular projection display device according to the second embodiment of the invention will be summarized concisely as the following items (8)-(12):

(8) A vehicular projection display device which outputs, from a projection unit (HUD unit 10), light that carries information including an arbitrary planar display image displayed in a prescribed display region and guides the light to a windshield (17) of a vehicle or its vicinity so that the display image carried by the light reflected from a surface of the windshield or its vicinity is projected and visually recognized as a virtual image (21) from a prescribed eye point (EP), characterized in that:

an image forming plane of the virtual image (virtual image forming plane 22) is inclined with respect to a plane that is perpendicular to a line of sight (18) that connects the eye point and the virtual image.

(9) The vehicular projection display device according to item (8), characterized in that:

a display panel (2D display panel 11) which displays the display image is disposed in an inclined state, and the light that is output from the projection unit is produced using light that travels along an inclined axis (Z) that is inclined from a direction that is perpendicular to a surface of the display panel.

(10) The vehicular projection display device according to item (9), characterized in that the display panel is a transmission display panel (transmission liquid crystal display panel 11A), the vehicular projection display device further characterized by comprising:

an illumination backlight (12) disposed behind the display panel.

(11) The vehicular projection display device according to item (9) or (10), characterized by further comprising an optical filter (14) which is disposed on the front side of the display panel, the vehicular projection display device further characterized in that:

the optical filter selectively transmits the light that travels along the inclined axis that is inclined from the direction that is perpendicular to the surface of the display panel.

(12) The vehicular projection display device according to any one of items (8) to (11), characterized in:

that the virtual image is formed (in area A1) below a horizontal line passing through the eye point (EP); and that the image forming plane of the virtual image is inclined in such a direction that a distance from the eye point to a top end (region top line 20a) of the virtual image is longer than a distance from the eye point to a bottom end (region bottom line 20b) of the virtual image.

Embodiment 3

Outline of Vehicular Projection Display Device

Figure 10:
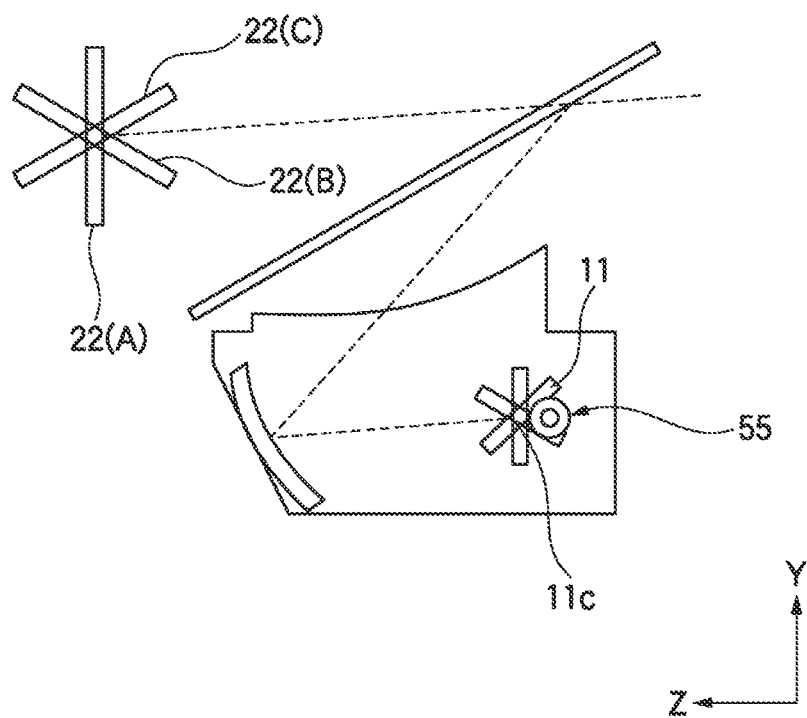
FIG. 10 is an optical path diagram showing optical paths of a vehicular projection display device according to a third embodiment of the invention in such a manner that a vehicle in which the vehicular projection display device is installed is viewed from its side.

FIGS. 1 and 10 outline a layout of individual units and optical paths of a vehicular projection display device according to a third embodiment of the invention in such a manner that a vehicle in which it is installed is viewed from its side. FIG. 1 shows a state that an virtual image forming plane 22 extends in the vertical direction, and FIG. 10 illustrates how the inclination of the virtual image forming plane 22 is adjusted. The vehicular projection display device according to this embodiment constitutes a head-up display (HUD) device.

An HUD display unit 10 shown in FIGS. 1 and 10 is incorporated in a dashboard which is disposed in front of the driver seat of the vehicle. A 2D display panel 11 and a reflection mirror 15 are disposed inside the HUD display unit 10. The 2D display panel 11 has a screen on which visible information of any of various patterns such as numerical values, a text, and a figure can be displayed when necessary. For a specific example, the 2D display panel 11 can display, on the screen, a numerical value and characters such as "km/h" indicating a current display value of a speedometer of the vehicle. The 2D display panel 11 can emit exit light 13 that carries information including visible information being displayed on its screen.

The exit light 13 of the 2D display panel 11 goes toward the reflection mirror 15 and then is reflected by the its surface, whereby resulting exit light 16 going obliquely upward is output through an opening (not shown) of the HUD display unit 10. The reflection mirror 15 is part of an enlarging optical system. The exit light 16 that is output from the HUD display unit 10 is reflected by a certain region 17a of the windshield 17 of the vehicle and thereby directed to an eye point EP.

Therefore, when the driver, for example, of the vehicle looks forward along a line of sight 18 from the eye point EP, he or she can visually recognize a virtual image 21 in front of the region 17a of the windshield 17. That is, the virtual image 21 having the same content as the visible image displayed on the screen of the 2D display panel 11 is formed in a virtual image forming plane 22.

Therefore, when the driver of the vehicle looks forward along the line of sight 18 from the eye point EP, he or she can visually recognize the virtual image 21 of the image displayed on the HUD display unit 10 in such a manner that it is superimposed on an outside scene (e.g., a road surface or the hood of the own vehicle).

One of the features of the configuration shown in FIGS. 1 and 10 is that the direction of the virtual image forming plane 22 is variable, that is, the virtual image forming plane 22 is rotatable about a rotation axis 22c. Therefore, the virtual image forming plane 22 can be oriented so as to be inclined with respect to the direction that is perpendicular to the line of sight 18.

To make the direction of the virtual image forming plane 22 variable, as shown in FIGS. 1 and 10 the 2D display panel 11 is supported so as to be rotatable about a rotation axis 11c that is located approximately at the center of the 2D display panel 11. And an inclination adjustment mechanism 55 is connected to the 2D display panel 11. Driven by drive force of an electric motor (described later), as shown in FIG. 10 the inclination adjustment mechanism 55 can set the direction of the surface of the 2D display panel 11 to any of various directions when necessary. The inclination adjustment mechanism 55 may be either a rotational mechanism or a link mechanism that moves linearly.

The virtual image forming plane 22 can be inclined by disposing the 2D display panel 11 in an inclined state. When the 2D display panel 11 is inclined, the optical axis for exit light 13 is inclined from the direction that is perpendicular to the surface of the 2D display panel 11.

Specific Example of Manner of Recognition by Driver

FIG. 4 shows specific examples of a scene ahead of the vehicle and a displayed virtual image that can be visually recognized by the driver of the vehicle. That is, the driver who is sitting on the driver seat of the vehicle can visually recognize, for example, a scene 30 shown in FIG. 4 through the transparent windshield 17. Furthermore, since the HUD display unit 10 shown in FIGS. 1 and 10 is installed in the vehicle, at the same time the driver can also visually recognize, for example, a virtual image 21 that is displayed in an HUD display region 20 shown in FIG. 4.

Manner of Recognition of Outside Scene

As shown in FIG. 4, the scene 30 that is visually recognized by the driver includes a road surface 30a, lane marks 30b on the road surface 30a, etc. The scene 30 is visually recognized so as to converge at a point at infinity 31 that is located ahead on the road. For example, in area A1 that is defined by the bottom line of an overall area that is visually recognized by the driver and a horizontal line passing through the point at infinity 31 and located at a vertical position Yc, the widths of the road surface 30a and the lane marks 30b become smaller as the position goes upward. This indicates that the distance to the object increases as its position goes upward. On the other hand, in area A2 that is defined by the horizontal line located at the vertical position Yc and a top line of the overall area recognized by the driver, the driver recognizes that the distance to the object increases as its position goes downward. In an ordinary state, the point at infinity 31 is a far point that occurs when the driver looks forward horizontally from the eye point EP.

Manner of Recognition of Virtual Image

In a state that the virtual image forming plane 22 shown in FIGS. 1 and 10 is inclined from the plane that is perpendicular to the line of sight 18, as shown in FIG. 4 the HUD display region 20 in which a virtual image 21 is displayed is shaped like a trapezoid. In the example of FIG. 4, the width in the X direction of a top line 20a of the region 20 is shorter than that of its bottom line 20b. Therefore, the shape of the HUD display region 20 causes the driver to feel the same sense of distance as he or she would feel when viewing the scene 30 which converges at the point at infinity 31.

In actuality, the HUD display region 20 shown in FIG. 4 corresponds to the virtual image forming plane 22 shown in FIGS. 1 and 10. For example, when the virtual image forming plane 22 is inclined like a virtual image forming plane 22(B) shown in FIG. 10, the top line 20a of the HUD display region 20 is more distant from the eye point EP than its bottom line 20b is and hence the virtual image 21 that is formed on the inclined HUD display region 20 can really provide perspective.

Furthermore, the perspective of the virtual image 21 obtained by the inclination of the virtual image forming plane 22 appears in the same direction as that of a nearby portion of the scene 30. That is, both of the virtual image 21 and the scene 30 are such as to cause the driver to feel that the object goes away from him or her as the position goes closer to the point at infinity 31. As a result, the driver is less prone to feel uncomfortable in terms of visual sense and can easily make eye focus adjustment.

Example Configuration (5) of 2D Display Panel 11

An example configuration (5) of a 2D display panel that can be employed in the vehicular projection display device shown in FIGS. 1 and 10 and a unit neighboring it will be described below with reference to FIG. 5.

In the configuration shown in FIG. 5, a transmission liquid crystal display panel 11A is employed as the 2D display panel 11. A backlight 12 is disposed behind the transmission liquid crystal display panel 11A.

In the example of FIG. 5, the surface of the flat-panel transmission liquid crystal display panel 11A is positioned by the inclination adjustment mechanism 55 so as to be inclined from the vertical direction (Y axis) by a prescribed angle θ. The backlight 12 emits illumination light 12a (e.g., white light) in the Z-axis direction. In passing through the transmission liquid crystal display panel 11A the illumination light 12a is modulated in density and color according to the content of a displayed image 11a and becomes exit light 13 that goes in the Z direction.

Where the transmission liquid crystal display panel 11A is inclined as shown in FIG. 5, points P1, P2, and P3 that are located at different positions in the displayed image 11a deviate from each other in the Z-axis direction. That is, coordinates (y1, z1) of point P1, coordinates (y2, z2) of point P2, and coordinates (y3, z3) of point P3 have differences in the optical axis direction (Z direction).

Since the positions in the Z direction of points P1, P2, and P3 that serve as light source points in displaying, for example, the virtual image 21 shown in FIGS. 1 and 10 are different from each other, the virtual image forming plane 22 is inclined like the transmission liquid crystal display panel 11A. That is, by disposing the transmission liquid crystal display panel 11A in an inclined state and emitting exit light 13 in a direction (Z direction) that is inclined from the direction perpendicular to the surface of the transmission liquid crystal display panel 11A, a virtual image 21 can be displayed in the virtual image forming plane 22 that is inclined. The depth of the virtual image 21 can be changed by adjusting the inclination angle θ of the transmission liquid crystal display panel 11A.

Example Configuration (6) of 2D Display Panel 11

FIG. 6 shows an example configuration (6) of a 2D display panel that can be employed in the vehicular projection display device shown in FIGS. 1 and 10 and a member neighboring it.

In the configuration of FIG. 6, a spontaneous emission display panel 11B is employed as the 2D display panel 11. More specifically, the spontaneous emission display panel 11B can be an organic EL display panel. As in the configuration of FIG. 5, the surface of the flat-panel spontaneous emission display panel 11B is positioned being inclined from the vertical direction (Y axis) by a prescribed angle θ.

In the configuration of FIG. 6, an optical filter 14 is attached to the front surface of the spontaneous emission display panel 11B. The optical filter 14 provides a function that is necessary for producing, from a displayed image 11a, exit light 13 that goes in the Z-axis direction. In a specific example, an optical member having direction selectivity is used as the optical filter 14, whereby the optical filter 14 is given such a property as to transmit light traveling in the Z direction and stop light traveling in the other directions. This prevents superfluous light other than the exit light 13 from going toward the reflection mirror 15.

Where the viewing angle of the spontaneous emission display panel 11B is relatively narrow, an optical member that refracts light is used as the optical filter 14 to refract light so that the maximum intensity direction (usually, it is perpendicular to its surface) of exit light from the spontaneous emission display panel 11B is inclined and coincides with the Z direction. As a result, the light quantity of the exit light 13 can be increased and the legibility of the virtual image 21 can be made higher.

When the spontaneous emission display panel 11B is positioned so that its surface becomes parallel with the Y axis, to prevent exit light 13 from attenuating being affected by the optical filter 14, it is necessary to dislocate the optical filter 14 from the position where it is opposed to the spontaneous emission display panel 11B or to adjust the orientation of the optical filter 14.

Configuration of Example System

Figure 11:
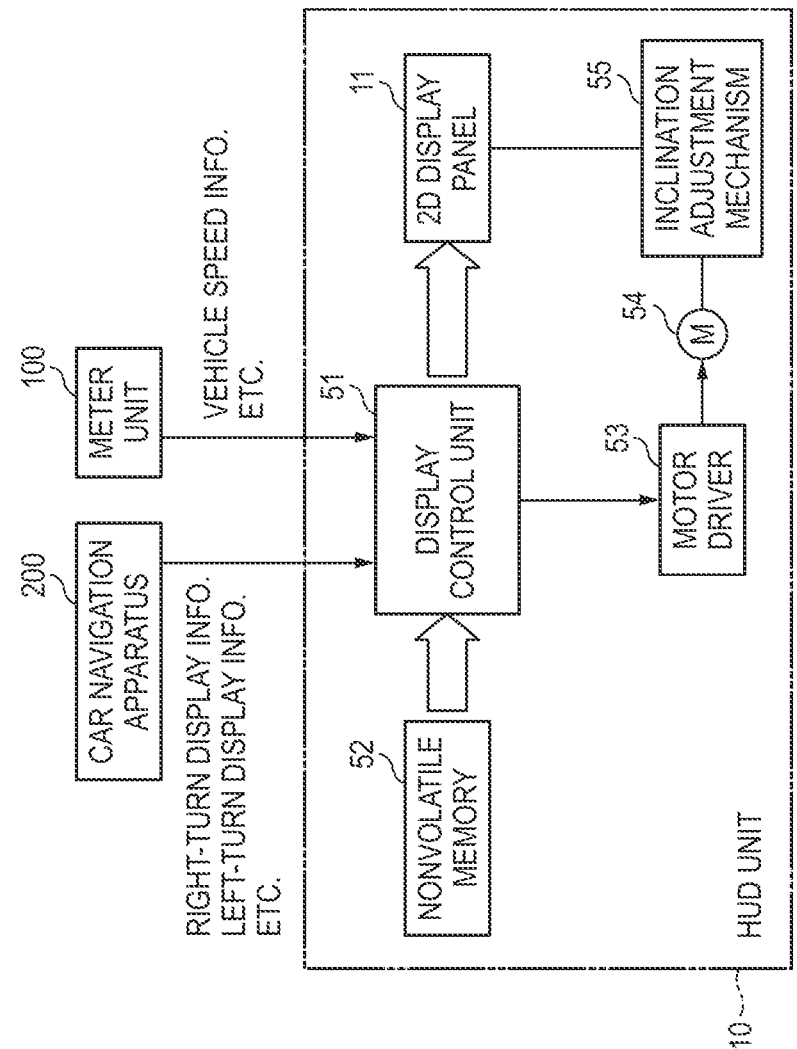
FIG. 11 is a block diagram showing the configuration of an example system including the vehicular projection display device according to the third embodiment.

FIG. 11 shows the configuration of an example system including the vehicular projection display device shown in FIGS. 1 and 10. The system shown in FIG. 11 is equipped with, in addition to the HUD display unit 10, a meter unit 100 and a car navigation apparatus 200 which are installed in the vehicle.

The meter unit 100 incorporates meters as typified by a speedometer and various display devices. For example, where the HUD display unit 10 shown in FIG. 11 is to display a vehicle speed in the form of a virtual image 21, vehicle speed information that is output from the meter unit 100 is input to the HUD display unit 10.

The car navigation apparatus 200 recognizes a current position of the self vehicle and displays a map including the current position on a prescribed screen, and can thereby guide the driver so that he or she can drive the vehicle along a predetermined movement route. The car navigation apparatus 200 has a turn-by-turn guidance function. For example, when the current position of the self vehicle is approaching an intersection or the like on a movement route, the turn-by-turn guidance function makes it possible to announce an appropriate movement direction in the form of, for example, a voice and display of an arrow. In giving left-turn or right-turn guidance by means of the turn-by-turn guidance function, the car navigation apparatus 200 shown in FIG. 11 outputs information about left-turn or right-turn display to the HUD display unit 10.

The HUD display unit 10 shown in FIG. 11 is equipped with a display control unit 51, a nonvolatile memory 52, a motor driver 53, an electric motor 54, and the inclination adjustment mechanism 55.

The display control unit 51, which is a microcomputer, can realize various control functions necessary for the HUD display unit 10 by running programs that are stored therein in advance. The display control unit 51 can perform a data communication with each of the meter unit 100 and the car navigation apparatus 200.

The nonvolatile memory 52 is stored in advance with fixed data of various display patterns to be displayed on the screens of the 2D display panel 11 and data of various constants that are necessary for controls by the display control unit 51. For example, when the HUD display unit 10 is to make a right-turn guidance display on the basis of an output of the car navigation apparatus 200, the display control unit 51 reads data of a right-turn guidance display pattern from the nonvolatile memory 52 and makes a right-turn guidance display (see FIG. 13A) on the screen of the 2D display panel 11.

When it is necessary to adjust the inclination angle of the surface of the 2D display panel 11, the display control unit 51 drives the electric motor 54 via the motor driver 53. As a result, the inclination adjustment mechanism 55 which is connected to the electric motor 54 is driven and the inclination angle of the 2D display panel 11 is changed.

Characteristic Control Operation

Figure 12:
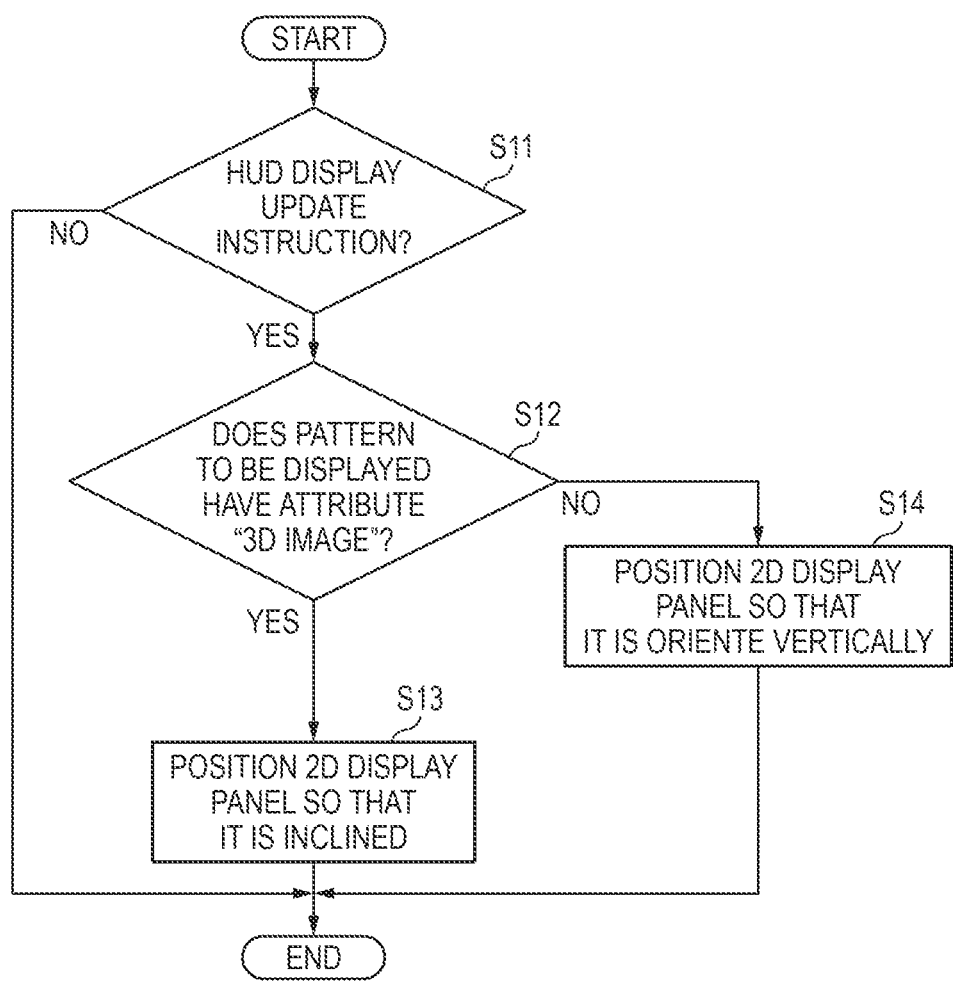
FIG. 12 is a flowchart of a main operation of the vehicular projection display device according to the third embodiment.

FIG. 12 shows the procedure of a characteristic, main control operation of the vehicular projection display device shown in FIGS. 1 and 10. That is, the characteristic control operation can be realized by the display control unit 51's executing the process of FIG. 12 on a regular basis, for example. The details of the process of FIG. 12 will be described below.

At step S11, the display control unit 51 judges whether an instruction to update the HUD display has been received or not. For example, if display information having higher display priority than the information currently displayed on the screens of the 2D display panel 11 has been input from the meter unit 100 or the car navigation apparatus 200, the display control unit 51 judges that an update instruction has been received and moves to step S12.

At step S12, the display control unit 51 judges whether the attribute of the pattern to be displayed is "3D image" or not.

Patterns whose display in the form of planar images is desirable, such as a numerical value representing a vehicle speed, are given an attribute "planar image." And patterns whose display in the form of 3D images is desirable, such as arrow patterns for right-turn guidance and left-turn guidance, are given an attribute "3D image." Such attribute data are determined in advance and registered in the nonvolatile memory 52.

Therefore, the display control unit 51 can recognize an attribute by referring to corresponding information stored in the nonvolatile memory 52. The process moves to step S13 if a pattern having the attribute "3D image" is to be displayed, and to step S14 if a pattern having the attribute "planar image" is to be displayed.

At step S13, the display control unit 51 positions the 2D display panel 11 so as to incline it by driving the inclination adjustment mechanism 55. As a result, the virtual image forming plane 22 is positioned so as to be inclined from the plane that is perpendicular to the line of sight 18 like a virtual image forming plane 22(B) shown in FIG. 10.

At step S14, the display control unit 51 positions the 2D display panel 11 so that its surface becomes perpendicular to the optical axis for exit light 13 by driving the inclination adjustment mechanism 55. As a result, the virtual image forming plane 22 is positioned so as to be perpendicular to the line of sight 18 like a virtual image forming plane 22(A) shown in FIG. 10.

Specific Display Examples

Figure 13A:
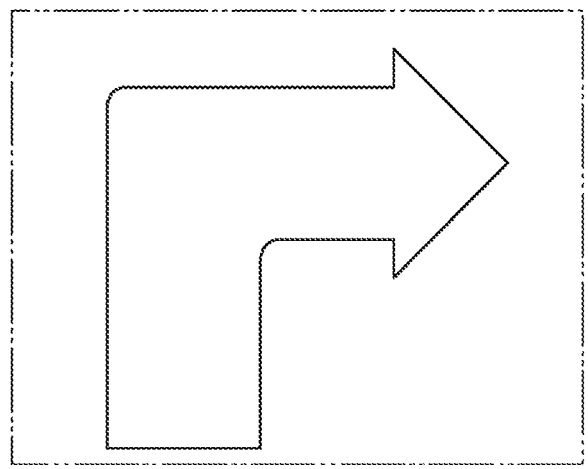
FIG. 13A shows a specific example image to be displayed on the screen of the 2D display panel.
Figure 13B:
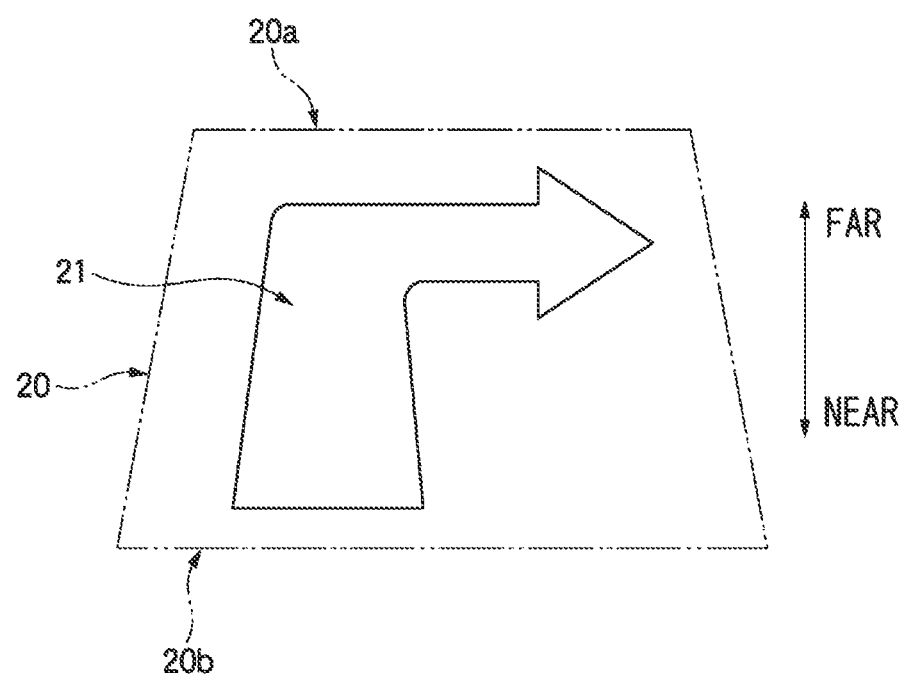
FIG. 13B is a view, as viewed from the eye point side, showing a specific example of a virtual image projected on an inclined virtual image forming plane.

FIG. 13A shows a specific example image to be displayed on the screen of the 2D display panels 11 by the HUD display unit 10. FIG. 13B shows how a virtual image 21 formed in the virtual image forming plane 22 is visually recognized when viewed from the eye point EP side.

For example, when a right-turn guidance display instruction is input to the display control unit 51 of the HUD display unit 10 from the car navigation apparatus 200, the car navigation apparatus 200 reads pattern data of right-turn guidance display from the nonvolatile memory 52 and displays a right-turn arrow pattern on the screen of the 2D display panel 11 in the manner shown in FIG. 13A.

The right-turn arrow pattern is assigned the attribute "3D image" in advance because it can be seen more easily when displayed with perspective. Therefore, in displaying the right-turn arrow pattern, the display control unit 51 executes step S13 shown in FIG. 12 to position the 2D display panel 11 in an inclined state, whereby the virtual image forming plane 22 is also inclined. As a result, since the image forming plane 22 is inclined, a virtual image 21 that is visually recognized from the eye point EP side is given a display form with perspective and depth (see FIG. 13B).

To display a pattern having the attribute "planar image" such as a pattern of a numerical value of a vehicle speed, the display control unit 51 executes step S14, whereby the 2D display panel 11 is positioned so as not to be inclined. Therefore, the virtual image forming plane 22 is oriented perpendicularly to the line of sight 18 and hence the driver can visually recognize a non-inclined virtual image 21 facing it squarely. In this case, high legibility is attained though the virtual image 21 is displayed as a planar display like the image displayed on screen of the 2D display panel 11.

Possible Modifications

The 2D display panel 11 may be a reflection display panel rather than a transmission type or spontaneous emission type one.

Whereas in the example of FIG. 4 the HUD display region 20 and the scene 30 are superimposed on each other, the layout may be changed so that a combiner (reflection plate) is disposed adjacent to the windshield 17, for example, on the dashboard and a virtual image 21 appears in a combiner region.

In the example of FIG. 4, since the HUD display region 20 is located below the position Yc corresponding to the point at infinity 31, the inclination direction of the virtual image forming plane 22 is determined so that the top line 20a of the HUD display region 20 is more distant from the eye point EP than its bottom line 20b. Conversely, where the HUD display region 20 is located above the position Yc, it would be proper to determine the inclination direction of the virtual image forming plane 22 so that its bottom line 20b is more distant from the eye point EP than its top line 20a.

In the process of FIG. 12, the 2D display panel 11 is positioned so as to be oriented in one of the two directions. However, it is conceivable to position the 2D display panel 11 so that it is oriented in one of more directions that correspond to various kinds of display patterns or situations of scenes on which the virtual image display region is to be superimposed, respectively. Another configuration is possible in which the inclination angles of the 2D display panel 11 and the virtual image forming plane 22 are fine-adjusted according to user taste in response to a manual adjustment instruction that is issued using a button or the like for receiving a user input.

Features of the vehicular projection display device according to the third embodiment of the invention will be summarized concisely as the following items (13)-(17):

(13) A vehicular projection display device which outputs, from a projection unit, light that carries information including an arbitrary planar display image displayed in a prescribed display region (2D display panel 11) and guides the light to a windshield (17) of a vehicle or its vicinity so that the display image carried by the light reflected from a surface of the windshield or its vicinity is projected and visually recognized as a virtual image from a prescribed eye point (EP), characterized by comprising:

an inclination adjustment mechanism (55) which adjusts the direction of an image forming plane of the virtual image (virtual image forming plane 22) with respect to an optical axis (line of sight 18), the vehicular projection display device further characterized in that:

the image forming plane whose direction has been adjusted by the inclination adjustment mechanism is inclined with respect to a plane that is perpendicular to a line of sight (18) that connects the eye point and the virtual image.

(14) The vehicular projection display device according to item (13), characterized in:

that the inclination adjustment mechanism (55) is connected to a support member that supports a display panel (2D display panel 11) which displays the display image; and that in a state that the image forming plane (22) is inclined, the light that is output from the projection unit is produced using light that travels along an inclined axis (Z)

that is inclined from a direction that is perpendicular to a surface of the display panel (see FIG. 1).

(15) The vehicular projection display device according to item (13), characterized by further comprising an inclination control unit (display control unit 51) which positions the image forming plane of the virtual image so that it is inclined by a prescribed angle by driving the inclination adjustment mechanism (S12 and S13) if information to be displayed as the virtual image satisfies a predetermined display condition (see FIGS. 11 and 12).

(16) The vehicular projection display device according to item (15), characterized in:

that the inclination control unit adjusts the inclination direction of the image forming plane of the virtual image to such a direction that a distance from the eye point to a top end of the virtual image is longer than a distance from the eye point to a bottom end of the virtual image in a case that the virtual image is formed below a horizontal line passing through the eye point (see FIG. 10).

(17) The vehicular projection display device according to item (14), characterized in that the display panel is a transmission display panel (transmission liquid crystal display panel 11A), the vehicular projection display device further characterized by further comprising:

an illumination backlight (12) disposed behind the display panel (see FIG. 5).

DESCRIPTION OF SYMBOLS

10: HUD unit
11: 2D display panel
11a: Displayed image
11c: Rotation axis
11A: Transmission liquid crystal display panel
11B: Spontaneous emission display panel
12: Backlight
12a: Illumination light
13, 16: Exit light
14: Optical filter
15: Reflection mirror
17: Windshield
18: Line of sight
20: HUD display region
20a: Region top line
20b: Region bottom line
21: Virtual image
22: Virtual image forming plane
22c: Rotation axis
30a: Road surface
30b: Lane mark on road surface
31: Point at infinity
51: Display control unit
52: Nonvolatile memory
53: Motor driver
54: Electric motor
55: Inclination adjustment mechanism
100: Meter unit
200: Car navigation apparatus
A1, A2: Area

What is claimed is:

1. A projection display device which outputs, from a projection unit, light that carries information including an arbitrary planar display image displayed in a prescribed display region and guides the light to a windshield of a vehicle or its vicinity so that the display image carried by the light reflected from a surface of the windshield or its vicinity is projected and visually recognized as a virtual image from a prescribed eye point, wherein a first image forming plane and a second image forming plane are simultaneously provided as image forming planes of the virtual image, the first image forming plane is disposed approximately parallel with a plane that is perpendicular to a line of sight that connects the eye point and the virtual image, and the second image forming plane is inclined with respect to the plane that is perpendicular to the line of sight that connects the eye point and the virtual image.

2. The projection display device according to claim 1 comprising:

a first display panel for formation of a virtual image in the first image forming plane; and a second display panel for formation of a virtual image in the second image forming plane, the projection display device, wherein the first display panel is disposed so as to be approximately perpendicular to an optical axis for exit light, the second display panel is disposed so as to be inclined from an optical axis for exit light, and the projection unit outputs light beams for formation of the virtual images on the basis of the exit light of the first display panel and the exit light of the second display panel.

3. The projection display device according to claim 2 further comprising a virtual image display control unit which judges a type of display subject information when receiving it from outside, and selects the first display panel or the second display panel as an output destination of the display subject information.

4. The projection display device according to claim 3, wherein the virtual image display control unit selects the first display panel as the output destination of the display subject information if the received display subject information is assigned a planar display attribute, and selects the second display panel as the output destination of the display subject information if the received display subject information is assigned a 3D display attribute.

5. The projection display device according to claim 2, wherein the second display panel is a transmission display panel, and the projection display device further comprises an illumination backlight disposed behind the second display panel.

6. The projection display device according to claim 1 further comprising an inclination adjustment mechanism which adjusts the inclination angle of the second image forming plane.

7. The projection display device according to claim 1, wherein the second image forming plane is inclined in such a direction that a distance from the eye point to a top end of the virtual image is longer than a distance from the eye point to a bottom end of the virtual image in a case that the virtual image is formed below a horizontal line passing through the eye point.

8. A projection display device which outputs, from a projection unit, light that carries information including an arbitrary planar display image displayed in a prescribed display region and guides the light to a windshield of a vehicle or its vicinity so that the display image carried by the light reflected from a surface of the windshield or its vicinity is projected and visually recognized as a virtual image from a prescribed eye point, wherein an image forming plane of the virtual image is inclined with respect to a plane that is perpendicular to a line of sight that connects the eye point and the virtual image, wherein a display panel which displays the display image is disposed in an inclined state, and the light that is output from the projection unit is produced using light that travels along an inclined axis that is inclined from a direction that is perpendicular to a surface of the display panel, wherein the display panel is a transmission display panel, and wherein the projection display device further comprising an illumination backlight disposed behind the display panel.

9. The projection display device according to claim 8 further comprising an optical filter which is disposed on the front side of the display panel, wherein the optical filter selectively transmits the light that travels along the inclined axis that is inclined from the direction that is perpendicular to the surface of the display panel.

10. The projection display device according to claim 8, wherein the virtual image is formed below a horizontal line passing through the eye point, and the image forming plane of the virtual image is inclined in such a direction that a distance from the eye point to a top end of the virtual image is longer than a distance from the eye point to a bottom end of the virtual image.

11. A projection display device which outputs, from a projection unit, light that carries information including an arbitrary planar display image displayed in a prescribed display region and guides the light to a windshield of a vehicle or its vicinity so that the display image carried by the light reflected from a surface of the windshield or its vicinity is projected and visually recognized as a virtual image from a prescribed eye point, the projection display device comprising:

an inclination adjustment mechanism which adjusts the direction of an image forming plane of the virtual image with respect to an optical axis, the projection display device, wherein the image forming plane whose direction has been adjusted by the inclination adjustment mechanism is inclined with respect to a plane that is perpendicular to a line of sight that connects the eye point and the virtual image, wherein the inclination adjustment mechanism is connected to a support member that supports a display panel which displays the display image, wherein in a state that the image forming plane is inclined, the light that is output from the projection unit is produced using light that travels along an inclined axis that is inclined from a direction that is perpendicular to a surface of the display panel, wherein the display panel is a transmission display panel, and the projection display device further comprises an illumination backlight disposed behind the display panel.

12. The projection display device according to claim 11 further comprising an inclination control unit which positions the image forming plane of the virtual image so that it is inclined by a prescribed angle by driving the inclination adjustment mechanism if information to be displayed as the virtual image satisfies a predetermined display condition.

13. The projection display device according to claim 12, wherein the inclination control unit adjusts the inclination direction of the image forming plane of the virtual image to such a direction that a distance from the eye point to a top end of the virtual image is longer than a distance from the eye point to a bottom end of the virtual image in a case that the virtual image is formed below a horizontal line passing through the eye point.

\* \* \* \* \*